US012627703B2

(12) United States Patent
Lei et al.

(10) Patent No.: US 12,627,703 B2
(45) Date of Patent: May 12, 2026

(54) METHOD FOR OBTAINING SECURITY CLASSIFICATION RESULT AND COMMUNICATION APPARATUS

(71) Applicant: HUAWEI TECHNOLOGIES CO., LTD., Guangdong (CN)

(72) Inventors: Ao Lei, Beijing (CN); Yizhuang Wu, Beijing (CN); Yang Cui, Beijing (CN); Taoran Sun, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 18/659,239

(22) Filed: May 9, 2024

(65) Prior Publication Data

US 2024/0291849 A1      Aug. 29, 2024

Related U.S. Application Data

(63) Continuation of application No. PCT/CN2022/130474, filed on Nov. 8, 2022.

(30) Foreign Application Priority Data

Nov. 11, 2021      (CN) .......................... 202111331286.8

(51) Int. Cl.
H04L 9/40              (2022.01)
(52) U.S. Cl.
CPC ................................ H04L 63/1433 (2013.01)
(58) Field of Classification Search
CPC ............. H04L 63/1433; H04L 63/1425; H04L 63/1458; H04L 63/1466; H04W 12/122; H04W 12/63; H04W 12/126
See application file for complete search history.

(56) References Cited

U.S. PATENT DOCUMENTS

2018/0026999 A1* 1/2018 Ruvio ................. H04L 41/0631
                                                                726/23
2018/0124697 A1* 5/2018 Nair .................... H04W 12/122
(Continued)

FOREIGN PATENT DOCUMENTS

AU        2021232816 A1 * 9/2022 ............ H04W 12/35
CN        113709844 A * 11/2021 ............ H04W 48/18
(Continued)

OTHER PUBLICATIONS

3GPP TSG-SA3 Meeting #100bis-e, S3-202782; "Update of Solution#15," Lenovo, Motorola Mobility, e-meeting, Oct. 12-16, 2020; 4 total pages (XP051940505).

(Continued)

*Primary Examiner* — Sarah Su
(74) *Attorney, Agent, or Firm* — Rimon PC

(57)                    ABSTRACT

Embodiments of this application provide a method for obtaining a security classification result for a location area. A security function network element receives an identifier of a target location area and determines to perform security analytics on the target location area based on the identifier of the target location area. The security function network element may determine a security classification result of the target location area based on first information, where the security classification result indicates a degree to which a potential attack exists in the target location area. The first information is related to behavior information of a terminal device in the target location area, where the behavior information includes traffic data and/or movement track information.

18 Claims, 6 Drawing Sheets

(56) References Cited

U.S. PATENT DOCUMENTS

| | | | | |
|---|---|---|---|---|
| 2021/0258334 A1* | 8/2021 | Sayag | ................. | H04L 63/1425 |
| 2022/0345483 A1* | 10/2022 | Shua | ..................... | H04L 9/0825 |
| 2023/0224275 A1* | 7/2023 | Zink | ................... | H04L 63/1433 |
| | | | | 726/11 |
| 2024/0114042 A1* | 4/2024 | Frey | ........................ | G06F 21/57 |
| 2024/0305662 A1* | 9/2024 | Kairali | ................ | H04L 63/0236 |

FOREIGN PATENT DOCUMENTS

| | | | | | | |
|---|---|---|---|---|---|---|
| CN | 116112930 | A | * | 5/2023 | .......... | H04W 12/122 |
| CN | 118585656 | A | * | 9/2024 | ............. | H04L 63/20 |
| CN | 118590309 | A | * | 9/2024 | ............... | H04L 9/40 |
| CN | 120129005 | A | * | 6/2025 | ........... | H04W 48/16 |
| CN | 120692685 | A | * | 9/2025 | ........ | H04M 1/72484 |
| EP | 3298814 | B1 | * | 5/2019 | ........... | H04W 12/28 |
| EP | 3488577 | B1 | * | 9/2021 | .......... | H04W 12/122 |
| TW | 202423079 | A | * | 6/2024 | .......... | H04L 63/162 |
| WO | WO-2020183236 | A1 | * | 9/2020 | .......... | H04W 12/106 |

OTHER PUBLICATIONS

3rd Generation Partnership Project; Technical Specification Group Services and System Aspects; Architecture enhancements for 5G System (5GS) to support Vehicle-to-Everything (V2X) services (Release 17), 3GPP TS 23.287 V17.1.0 (Sep. 2021), Technical Specification, total 59 pages.

3rd Generation Partnership Project; Technical Specification Group Core Network and Terminals; Non-Access-Stratum (NAS) protocol for 5G System (5GS); Stage 3; (Release 17), 3GPP TS 24.501 V17.4.1 (Sep. 2021), Technical Specification, total 863 pages.

3rd Generation Partnership Project; Technical Specification Group Services and System Aspects; Architecture enhancements for 5G System (5GS) to support network data analytics services (Release 17), 3GPP TS 23.288 V17.2.0 (Sep. 2021), Technical Specification, total 196 pages.

3rd Generation Partnership Project; Technical Specification Group Services and System Aspects; Study on system enhancement for Proximity based Services (ProSe) in the 5G System (5GS) (Release 17), 3GPP TR 23.752 V0.4.0 (Jun. 2020), Technical Report, total 121 pages.

3rd Generation Partnership Project; Technical Specification Group Services and System Aspects; Security aspects of 3GPP support for advanced Vehicle-to-Everything (V2X) services (Release 16), 3GPP TS 33.536 V16.2.0 (Dec. 2020), Technical Specificationt, total 24 pages.

* cited by examiner

300

S310: Determine to perform security analytics on a target location area

S320: Determine a security classification result of the target location area based on first information, where the first information is related to behavior information of a terminal device in the target location area

400

<u>500</u>

600

700

| UE #1 | SMF/ AMF | Distributed security analytics network element | Centralized security analytics network element | PCF/ UDM | AF |
|-------|----------|------------------------------------------------|------------------------------------------------|----------|-----|

S701: Determine a security protection policy

S702: Determine a location analytics list

S703: Security analytics request message

S704: Behavior information of a UE

S706: Second information

S707: Determine a security classification result of a location area

S709: Registration request/Session establishment request message

S708: Security classification result

S705: First mapping relationship

S710: Request message #1

S711: Determine a security protection mode for the UE #1

S712: Security protection mode of the UE #1

FIG. 7

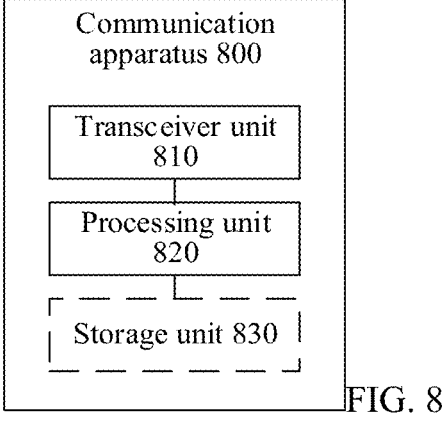

Communication apparatus 800

Transceiver unit 810

Processing unit 820

Storage unit 830

FIG. 8

METHOD FOR OBTAINING SECURITY CLASSIFICATION RESULT AND COMMUNICATION APPARATUS

CROSS-REFERENCE TO RELATED APPLICATIONS

This application is a continuation of International Application No. PCT/CN2022/130474, filed on Nov. 8, 2022, which claims priority to Chinese Patent Application No. 202111331286.8, filed on Nov. 11, 2021. The disclosures of the aforementioned applications are hereby incorporated by reference in their entireties.

TECHNICAL FIELD

Embodiments of this application relate to the communication field, and more specifically, to a method for obtaining a security classification result and a communication apparatus.

BACKGROUND

In a 5th generation (5G) mobile network, an attacker may have a mobility capability, and may move to different geographical locations to attack a network or a user equipment (UE), threatening security and privacy of the UE. For example, in a fake base station (FBS) attack, a fake base station is an attacker of a man-in-the-middle (MITM) attack. As shown in FIG. 2, a UE and a base station are connected through a Uu interface, and radio resource control (RRC) signaling and user plane data may be transmitted between the UE and the base station. The base station and an access and mobility management function (AMF) network element are connected through an N2 interface, and communicate with each other by using an N2 interface protocol. An attacker may deploy a fake base station to attract a UE to camp on the fake base station. If a UE camps on the fake base station, a fake UE part of the fake base station may forward or modify some information about the genuine UE camping on the fake base station, access a genuine base station as the genuine UE, and communicate with the AMF by using the N2 interface protocol. In this way, communication content between a genuine terminal and a network can be sniffed, tampered with, or forged. A fake base station device is similar to a laptop in size and is easy to move. Therefore, an attacker can randomly move to different locations to launch attacks.

As mentioned above, it is important to analyze and evaluate security of different location areas when an attacker can move randomly.

SUMMARY

Embodiments of this application provide a method for obtaining a security classification result, to perform security analytics on a location area, so as to obtain a security classification result of the location area.

According to a first aspect, a method for obtaining a security classification result is provided. The method includes: A security function network element determines to perform security analytics on a target location area; and the security function network element determines a security classification result of the target location area based on first information, where the security classification result indicates a degree to which a potential attack exists in the target location area, the first information is related to behavior information of a terminal device in the target location area, and the behavior information includes traffic data and/or movement track information.

The security function network element is a network element having a security analytics function. For example, the security function network element may be a network element that is completely responsible for security analytics, or may be a network element having some security-related functions.

According to the foregoing technical solution, after determining to perform security analytics on the target location area, the security function network element may perform security analytics on the target location area based on the first information determined by using the behavior information of the terminal device in the target location area, to obtain the security classification result of the target location area. When the security classification result of the target location area is obtained, this helps determine a security protection mode of the terminal device in the target location area based on the security classification result of the target location area, to better ensure security of a network and the terminal device. For example, when the security classification result of the target location area indicates that the degree to which the potential attack exists in the target location area is high, security protection is forcibly enabled, to prevent the network or the terminal device from being attacked to some extent.

In a possible implementation, the first information includes the behavior information of the terminal device in the target location area, and that the security function network element determines a security classification result of the target location area based on first information includes: The security function network element performs statistical analytics on the behavior information of the terminal device in the target location area to obtain first statistical information; and/or performs abnormal behavior prediction on the behavior information of the terminal device in the target location area to obtain a first abnormal behavior prediction result; and the security function network element determines the security classification result of the target location area based on the first statistical information and/or the first abnormal behavior prediction result.

Optionally, the method further includes: The security function network element sends a data collection request message to a data collection network element in the target location area, where the data collection request message is used to request behavior information of a terminal device served by the data collection network element; and the security function network element receives, from the data collection network element, the behavior information of the terminal device served by the data collection network element.

Optionally, the data collection request message further includes a first time interval parameter and/or a first threshold, the first time interval parameter indicates a periodicity for reporting the behavior information of the terminal device, and the first threshold indicates a minimum value or a maximum value for triggering reporting of the behavior information of the terminal device.

According to the foregoing technical solution, the security classification result of the target location area may be periodically determined based on periodically collected behavior information of the terminal device, to adjust the security protection mode of the terminal device in the target location area based on the periodically determined security analytics result. Alternatively, a data collection range is narrowed, to reduce a processing burden of the security function network element.

In another possible implementation, the first information includes second information sent by a security analytics network element, and the second information includes second statistical information, a second abnormal behavior prediction result, and/or a security classification result of a location area managed by the security analytics network element; and the second statistical information is obtained by performing statistical analytics on behavior information of a terminal device in the location area managed by the security analytics network element, the second abnormal behavior prediction result is obtained by performing abnormal behavior prediction on the behavior information of the terminal device in the location area managed by the security analytics network element, the security classification result of the location area managed by the security analytics network element is determined based on the behavior information of the terminal device in the location area managed by the security analytics network element, and the location area managed by the security analytics network element corresponds to the target location area.

That the location area managed by the security analytics network element corresponds to the target location area includes the following several cases: The location area managed by the security analytics network element is the same as the target location area, the location area managed by the security analytics network element is a part of the target location area, and the location area managed by the security analytics network element partially overlaps the target location area.

According to the foregoing technical solution, the security function network element cooperates with the security analytics network element to perform security analytics on the target location area, to obtain the security classification result of the target location area, so that a processing burden of the security function network element can be reduced, and processing efficiency can be improved.

Optionally, the method further includes: The security function network element sends a security analytics request message to the security analytics network element based on the target location area, where the security analytics request message is used to request the security analytics network element to perform security analytics on the managed location area.

As described above, if the location area managed by the security analytics network element partially overlaps the target location area, the security analytics request message further includes an identifier of the target location area. The identifier of the target location area is a first identifier of the target location area or a second identifier of the target location area. The first identifier of the target location area includes one or more of the following: coordinate information, a geographic area identifier, address information, a tracking area identifier (TAI), and a cell identifier (cell ID). The second identifier of the target location area includes one or more of the following: coordinate information, a geographic area identifier, address information, a TAI, and a cell ID. For example, the first identifier of the target location area is an identifier used outside the network, for example, coordinate information, a geographical area identifier, or address information, and the second identifier of the target location area is an identifier used inside the network, for example, a TAI or a cell ID.

Optionally, the method further includes: The security function network element sends the security classification result of the location area managed by the security analytics network element to the security analytics network element.

According to the foregoing technical solution, the security function network element sends the security classification result of the location area managed by the security analytics network element to the security analytics network element, so that the security analytics network element may send the security classification result of the managed location area to a policy control function network element or a unified data management network element, and the policy control function network element or the unified data management network element determines the security protection mode of the terminal device based on the security classification result of the location area managed by the security analytics network element.

Optionally, the security analytics request message further includes an analytics identifier, the second information further includes the analytics identifier, and the analytics identifier identifies security analytics performed on the target location area.

As described above, if the location area managed by the security analytics network element is a part of the target location area, the security function network element sends the security analytics request message to a plurality of security analytics network elements, and receives the second information from the plurality of security analytics network elements. In this case, the security function network element determines, based on the analytics identifier, that the second information received from the plurality of security analytics network elements is used to determine the security classification result of the target location area.

With reference to the first aspect, in some implementations of the first aspect, the method further includes: The security function network element receives third information from a first network element, where the third information indicates to perform security analytics on all location areas in a public land mobile network (PLMN) in which the security function network element is located; and that a security function network element determines to perform security analytics on a target location area includes: The security function network element determines, based on the third information, to perform security analytics on all the location areas in the PLMN, where all the location areas in the PLMN include the target location area.

The first network element may be a policy control function network element, a unified data management network element, an application function network element, or the like.

According to the foregoing technical solution, the security function network element may perform, as indicated by the first network element, security analytics on all the location areas in the PLMN in which the security function network element is located, to satisfy a security analytics requirement of the first network element.

For example, the third information includes an identifier of each of all the location areas in the PLMN.

It should be noted that different location areas in the PLMN have different identifiers.

With reference to the first aspect, in some implementations of the first aspect, the method further includes: The security function network element receives an identifier of the target location area from a first network element; and that a security function network element determines to perform security analytics on a target location area includes: The security function network element determines, based on the identifier of the target location area, to perform security analytics on the target location area.

According to the foregoing technical solution, the security function network element may perform security analytics on the target location area as indicated by the first network element, to satisfy the security analytics requirement of the first network element.

With reference to the first aspect, in some implementations of the first aspect, the method further includes: The security function network element receives a security policy request message, where the security policy request message includes location area information of a first terminal device, and the location area information of the first terminal device indicates that the first terminal device is located in the target location area; and the security function network element sends a security protection mode determined for the first terminal device, where the security protection mode is determined based on the security classification result of the target location area.

According to the foregoing technical solution, the security function network element may determine the security protection mode for the first terminal device based on the security classification result of the target location area, to better ensure the security of the network and the first terminal device. For example, when the security classification result of the target location area is low, security protection is forcibly enabled, to prevent the network or the first terminal device from being attacked to some extent.

With reference to the first aspect, in some implementations of the first aspect, the method further includes: The security function network element receives a first identifier of a first terminal device and location area information of the first terminal device, where the location area information of the first terminal device indicates that the first terminal device is located in the target location area; and that a security function network element determines to perform security analytics on a target location area includes: The security function network element determines, based on the first identifier of the first terminal device, that a security enhancement service is allowed to be performed on the first terminal device; and the security function network element determines, based on the location area information of the first terminal device, to perform security analytics on the target location area.

According to the foregoing technical solution, security analytics can be performed on the location area in which the terminal device on which the security enhancement service is allowed to be performed is located, but security analytics is not performed on all the location areas, to reduce signaling used for data collection and the processing burden of the security function network element.

The first identifier of the first terminal device includes one or more of the following: an internet protocol (IP) address, a subscription permanent identifier (SUPI), a permanent equipment identifier (PEI), a generic public subscription identifier (GPSI), an international mobile subscriber identity (IMSI), an international mobile equipment identity (IMEI), and an IP address and a mobile station international integrated service digital network number (MSISDN). For example, the first identifier of the first terminal device is an identifier used inside the network. For example, the first identifier of the first terminal device includes one or both of the following: an SUPI and a GPSI.

With reference to the first aspect, in some implementations of the first aspect, the method further includes: The security function network element receives a second identifier of the first terminal device from a first network element; and that the security function network element determines, based on the first identifier of the first terminal device, that a security enhancement service is allowed to be performed on the first terminal device includes: The security function network element determines, based on a correspondence between the first identifier of the first terminal device and the second identifier of the first terminal device, that the security enhancement service is allowed to be performed on the first terminal device.

According to the foregoing technical solution, the security function network element may determine, based on the second identifier that is of the first terminal device and that is received from the first network element, that the security enhancement service is allowed to be performed on the first terminal device, to satisfy different requirements of the first network element.

The second identifier of the first terminal device includes one or more of the following: a user name of an external application, a third-party user identifier, an IP address, an SUPI, a PEI, a GPSI, an IMSI, an IMEI, and an IP address and an MSISDN. The second identifier of the first terminal device is different from the first identifier of the first terminal device, or the second identifier of the first terminal device is the same as the first identifier of the first terminal device. This is not limited in embodiments of this application. For example, the second identifier of the first terminal device is an identifier used outside the network. For example, the second identifier of the first terminal device includes one or more of the following: a user name of an external application, a third-party user identifier, an IP address, and an IP address and an MSISDN.

With reference to the first aspect, in some implementations of the first aspect, the method further includes: The security function network element determines that security analytics is allowed to be performed on the target location area.

According to the foregoing technical solution, security analytics can be performed on the location area, but security analytics is not performed on all the location areas, to reduce signaling used for data collection and the processing burden of the security function network element.

With reference to the first aspect, in some implementations of the first aspect, the method further includes: The security function network element receives an identifier of the target location area from the first network element; and that the security function network element determines that security analytics is allowed to be performed on the target location area includes: The security function network element determines, based on a correspondence between the location area information of the first terminal device and the identifier of the target location area, that security analytics is allowed to be performed on the target location area.

According to the foregoing technical solution, the security function network element may determine, based on the identifier that is of the location area and that is received from the first network element, the location area on which security analytics is allowed to be performed, to satisfy different security analytics requirements of the first network element.

With reference to the first aspect, in some implementations of the first aspect, the method further includes: The security function network element sends a security protection mode determined for the first terminal device, where the security protection mode is determined based on the security classification result of the target location area.

According to the foregoing technical solution, the security function network element may determine the security protection mode for the first terminal device based on the security classification result of the target location area, to better ensure the security of the network and the first terminal device. For example, when the security classification result of the target location area is low, security protection is forcibly enabled, to prevent the network or the first terminal device from being attacked to some extent.

With reference to the first aspect, in some implementations of the first aspect, that a security function network element determines to perform security analytics on a target location area includes: The security function network element determines to perform security analytics on the target location area for a target attack, where the security classification result of the target location area includes a security classification result of the target location area for the target attack, and the security classification result of the target location area for the target attack indicates a degree to which the potential target attack exists in the target location area.

According to the foregoing technical solution, the security function network element determines to perform security analytics on the target location area for the target attack, to obtain the security classification result of the target location area for the target attack. In this way, this helps determine, based on the security classification result of the target location area for the target attack, a security protection mode that can prevent the target attack for the terminal device in the target location area. For example, if a security classification result of the target location area for an air interface distributed denial of service (DDoS) attack indicates that a degree to which a potential air interface DDoS attack exists in the target location area is high, air interface security protection may be enabled or additional authentication for air interface access may be enabled.

With reference to the first aspect, in some implementations of the first aspect, the method further includes: The security function network element receives an identifier of the target attack from the first network element; and that the security function network element determines to perform security analytics on the target location area for a target attack includes: The security function network element determines, based on the identifier of the target attack, to perform security analytics on the target location area for the target attack.

With reference to the first aspect, in some implementations of the first aspect, the method further includes: The security function network element sends a first mapping relationship to a policy control function network element or a unified data management network element, where the first mapping relationship includes the identifier of the target location area and the security classification result of the target location area.

According to the foregoing technical solution, the security function network element sends the security classification result of the target location area to the policy control function network element or the unified data management network element, so that the policy control function network element or the unified data management network element may determine the security protection mode for the terminal device in the target location area based on the security classification result.

According to a second aspect, a method for obtaining a security classification result is provided. The method is performed by a policy control function network element or a unified data management network element, and the method includes: determining to perform security analytics on a target location area; sending a first security analytics request message to a security analytics network element, where the first security analytics request message includes an identifier of the target location area; and receiving a security classification result that is of the target location area and that is from the security analytics network element, where the security classification result indicates a degree to which a potential attack exists in the target location area.

For descriptions of the identifier of the target location area, refer to the first aspect.

According to the foregoing technical solution, when it is determined to perform security analytics on the target location area, the first security analytics request message is sent to the security analytics network element, so that the security analytics network element may perform security analytics on the target location area based on the identifier that is of the target location area and that is included in the first security analytics request message, to obtain the security classification result of the target location area. When the security classification result of the target location area is obtained, this helps determine a security protection mode of a terminal device in the target location area based on the security classification result of the target location area, to better ensure security of a network and the terminal device. For example, when the security classification result of the target location area indicates that the degree to which the potential attack exists in the target location area is high, security protection is forcibly enabled, to prevent the network or the terminal device from being attacked to some extent.

With reference to the second aspect, in some implementations of the second aspect, the determining to perform security analytics on a target location area includes: determining to perform security analytics on the target location area for a target attack, where the first security analytics request message further includes an identifier of the target attack; and the security classification result of the target location area includes a security classification result of the target location area for the target attack, and the security classification result of the target location area for the target attack indicates a degree to which the potential target attack exists in the target location area.

According to the foregoing technical solution, it is determined to perform security analytics on the target location area for the target attack, to obtain the security classification result of the target location area for the target attack. In this way, this helps determine, based on the security classification result of the target location area for the target attack, a security protection mode that can prevent the target attack for the terminal device in the target location area. For example, if a security classification result of the target location area for an air interface DDoS attack indicates that a degree to which a potential air interface DDoS attack exists in the target location area is high, air interface security protection may be enabled or additional authentication for air interface access may be enabled.

With reference to the second aspect, in some implementations of the second aspect, the method further includes: receiving third information from an application function network element, where the third information indicates to perform security analytics on all location areas in a PLMN; and the determining to perform security analytics on a target location area includes: determining, based on the third information, to perform security analytics on all the location areas in the PLMN, where all the location areas in the PLMN include the target location area.

According to the foregoing technical solution, security analytics may be performed on all the location areas in the PLMN as indicated by the application function network element, to satisfy a security analytics requirement of the application function network element.

With reference to the second aspect, in some implementations of the second aspect, the third information includes an identifier of each of all the location areas in the PLMN.

With reference to the second aspect, in some implementations of the second aspect, the method further includes: receiving an identifier of the target location area from an application function network element; and the determining to perform security analytics on a target location area includes: determining, based on the identifier of the target location area, to perform security analytics on the target location area.

According to the foregoing technical solution, security analytics may be performed on the target location area as indicated by the application function network element, to satisfy a security analytics requirement of the application function network element.

With reference to the second aspect, in some implementations of the second aspect, the method further includes: receiving the identifier of the target attack from an application function network element; and the determining to perform security analytics on the target location area for a target attack includes: determining, based on the identifier of the target attack, to perform security analytics on the target location area for the target attack.

According to the foregoing technical solution, security analytics may be performed on the target location area for the target attack as indicated by the application function network element, to satisfy a security analytics requirement of the application function network element.

With reference to the second aspect, in some implementations of the second aspect, before the sending a first security analytics request message to a security analytics network element, the method further includes: receiving a first identifier of a first terminal device and location area information of the first terminal device, where the location area information of the first terminal device indicates that the first terminal device is located in the target location area; and determining, based on the first identifier of the first terminal device, that a security enhancement service is allowed to be performed on the first terminal device.

For descriptions of the first identifier of the first terminal device, refer to the first aspect.

According to the foregoing technical solution, security analytics can be performed on the location area in which the terminal device on which the security enhancement service is allowed to be performed is located, but security analytics is not performed on all the location areas, to reduce signaling used for data collection and a processing burden of the security analytics network element.

With reference to the second aspect, in some implementations of the second aspect, the method further includes: receiving a second identifier of the first terminal device from the application function network element; and the determining, based on the first identifier of the first terminal device, that a security enhancement service is allowed to be performed on the first terminal device includes: determining, based on a correspondence between the first identifier of the first terminal device and the second identifier of the first terminal device, that the security enhancement service is allowed to be performed on the first terminal device.

For descriptions of the second identifier of the first terminal device, refer to the first aspect.

According to the foregoing technical solution, it may be determined, based on the second identifier that is of the first terminal device and that is received from the application function network element, that the security enhancement service is allowed to be performed on the first terminal device, to satisfy different requirements of the application function network element.

With reference to the second aspect, in some implementations of the second aspect, the method further includes: sending a security protection mode determined for the first terminal device, where the security protection mode is determined based on the security classification result of the target location area.

According to the foregoing technical solution, the security protection mode may be determined for the first terminal device based on the security classification result of the target location area, to better ensure the security of the network and the first terminal device. For example, when the security classification result of the target location area is low, security protection is forcibly enabled, to prevent the network or the first terminal device from being attacked to some extent.

According to a third aspect, a method for obtaining a security classification result is provided. The method includes: A security analytics network element receives a first security analytics request message from a policy control function network element or a unified data management network element, where the first security analytics request message includes an identifier of a target location area; the security analytics network element determines a security classification result of the target location area based on first information, where the security classification result indicates a degree to which a potential attack exists in the target location area, the first information is related to behavior information of a terminal device in the target location area, and the behavior information includes traffic data and/or movement track information; and the security analytics network element sends a first mapping relationship to the policy control function network element or the unified data management network element, where the first mapping relationship includes the identifier and the security classification result of the target location area.

For descriptions of the identifier of the target location area, refer to the first aspect.

According to the foregoing technical solution, the security analytics network element may determine, based on the identifier that is of the target location area and that is included in the first security analytics request message, to perform security analytics on the target location area, and then may perform security analytics on the target location area based on the first information determined based on the behavior information of the terminal device in the target location area, to obtain the security classification result of the target location area. The security analytics network element sends the security analytics result of the target location area to the policy control function network element or the unified data management network element, so that the policy control function network element or the unified data management network element determines a security protection mode of the terminal device in the target location area based on the security classification result of the target location area, to better ensure security of a network and the terminal device. For example, when the security classification result of the target location area indicates that the degree to which the potential attack exists in the target location area is high, security protection is forcibly enabled, to prevent the network or the terminal device from being attacked to some extent.

With reference to the third aspect, in some implementations of the third aspect, the first security analytics request message further includes an identifier of a target attack, the security classification result of the target location area includes a security classification result of the target location area for the target attack, and the security classification result of the target location area for the target attack indicates a degree to which the potential target attack exists in the target location area.

According to the foregoing technical solution, it is determined to perform security analytics on the target location area for the target attack, to obtain the security classification result of the target location area for the target attack. In this way, this helps the policy control function network element or the unified data management network element determine, for the terminal device in the target location area based on the security classification result of the target location area for the target attack, a security protection mode that can prevent the target attack. For example, if a security classification result of the target location area for an air interface DDoS attack indicates that a degree to which a potential air interface DDoS attack exists in the target location area is high, air interface security protection may be enabled or additional authentication for air interface access may be enabled.

With reference to the third aspect, in some implementations of the third aspect, the first information includes the behavior information of the terminal device in the target location area, and that the security analytics network element determines a security classification result of the target location area based on first information includes: The security analytics network element performs statistical analytics on the behavior information of the terminal device in the target location area to obtain first statistical information; and/or performs abnormal behavior prediction on the behavior information of the terminal device in the target location area to obtain a first abnormal behavior prediction result; and the security analytics network element determines the security classification result of the target location area based on the first statistical information and/or the first abnormal behavior prediction result.

With reference to the third aspect, in some implementations of the third aspect, the method further includes: The security analytics network element sends a data collection request message to a data collection network element in the target location area, where the data collection request message is used to request behavior information of a terminal device served by the data collection network element; and the security analytics network element receives, from the data collection network element, the behavior information of the terminal device served by the data collection network element.

With reference to the third aspect, in some implementations of the third aspect, the data collection request message further includes a first time interval parameter and/or a first threshold, the first time interval parameter indicates a periodicity for reporting the behavior information of the terminal device, and the first threshold indicates a minimum value or a maximum value for triggering reporting of the behavior information of the terminal device.

According to the foregoing technical solution, the security classification result of the target location area may be periodically determined based on periodically collected behavior information of the terminal device, to adjust the security protection mode of the terminal device in the target location area based on the periodically determined security analytics result. Alternatively, a data collection range is narrowed, to reduce a processing burden of the security function network element.

With reference to the third aspect, in some implementations of the third aspect, the security analytics network element is a centralized security analytics network element, the first information includes second information sent by a distributed security analytics network element, and the second information includes second statistical information, a second abnormal behavior prediction result, and/or a security classification result of a location area managed by the distributed security analytics network element; and the second statistical information is obtained by performing statistical analytics on behavior information of a terminal device in the location area managed by the distributed security analytics network element, the second abnormal behavior prediction result is obtained by performing abnormal behavior prediction on the behavior information of the terminal device in the location area managed by the distributed security analytics network element, the security classification result of the location area managed by the distributed security analytics network element is determined based on the behavior information of the terminal device in the location area managed by the distributed security analytics network element, and the location area managed by the distributed security analytics network element corresponds to the target location area.

That the location area managed by the distributed security analytics network element corresponds to the target location area includes the following several cases: The location area managed by the distributed security analytics network element is the same as the target location area, the location area managed by the distributed security analytics network element is a part of the target location area, and the location area managed by the distributed security analytics network element partially overlaps the target location area.

According to the foregoing technical solution, the centralized security analytics network element cooperates with the distributed security analytics network element to perform security analytics on the target location area, to obtain the security classification result of the target location area, so that a processing burden of the centralized security analytics network element can be reduced, and processing efficiency can be improved.

With reference to the third aspect, in some implementations of the third aspect, the centralized security analytics network element sends a second security analytics request message to the distributed security analytics network element based on the target location area, where the second security analytics request message is used to request the distributed security analytics network element to perform security analytics on the managed location area.

As described above, if the location area managed by the distributed security analytics network element partially overlaps the target location area, the second security analytics request message further includes the identifier of the target location area. If the first security analytics request message includes the identifier of the target attack, the second security analytics request message also includes the identifier of the target attack.

With reference to the third aspect, in some implementations of the third aspect, the method further includes: The centralized security analytics network element sends, to the distributed security analytics network element, the security classification result of the location area managed by the distributed security analytics network element.

According to the foregoing technical solution, the centralized security analytics network element sends the security classification result of the location area managed by the distributed security analytics network element to the distributed security analytics network element, so that the distributed security analytics network element may send the security classification result of the managed location area to a policy control function network element or a unified data management network element, and the policy control function network element or the unified data management network element determines a security protection mode of the terminal device based on the security classification result of the location area managed by the distributed security analytics network element.

With reference to the third aspect, in some implementations of the third aspect, the second security analytics request message further includes an analytics identifier, the second information further includes the analytics identifier, and the analytics identifier identifies security analytics performed on the target location area.

As described above, if the location area managed by the distributed security analytics network element is a part of the target location area, the centralized security analytics network element sends the second security analytics request message to a plurality of distributed security analytics network elements, and receives the second information from the plurality of distributed security analytics network elements. In this case, the centralized security analytics network element determines, based on the analytics identifier, that the second information received from the plurality of distributed security analytics network elements is used to determine the security classification result of the target location area.

According to a fourth aspect, a communication apparatus is provided. The communication apparatus includes a processing unit, where the processing unit is configured to determine to perform security analytics on a target location area; and the processing unit is further configured to determine a security classification result of the target location area based on first information, where the security classification result indicates a degree to which a potential attack exists in the target location area, the first information is related to behavior information of a terminal device in the target location area, and the behavior information includes traffic data and/or movement track information.

With reference to the fourth aspect, in some implementations of the fourth aspect, the first information includes the behavior information of the terminal device in the target location area, and the processing unit is further configured to: perform statistical analytics on the behavior information of the terminal device in the target location area to obtain first statistical information; and/or perform abnormal behavior prediction on the behavior information of the terminal device in the target location area to obtain a first abnormal behavior prediction result; and determine the security classification result of the target location area based on the first statistical information and/or the first abnormal behavior prediction result.

With reference to the fourth aspect, in some implementations of the fourth aspect, the communication apparatus further includes a transceiver unit, where the transceiver unit is configured to send a data collection request message to a data collection network element in the target location area, where the data collection request message is used to request behavior information of a terminal device served by the data collection network element; and the transceiver unit is further configured to receive, from the data collection network element, the behavior information of the terminal device served by the data collection network element.

With reference to the fourth aspect, in some implementations of the fourth aspect, the data collection request message further includes a first time interval parameter and/or a first threshold, the first time interval parameter indicates a periodicity for reporting the behavior information of the terminal device, and the first threshold indicates a minimum value or a maximum value for triggering reporting of the behavior information of the terminal device.

With reference to the fourth aspect, in some implementations of the fourth aspect, the first information includes second information sent by a security analytics network element, and the second information includes second statistical information, a second abnormal behavior prediction result, and/or a security classification result of a location area managed by the security analytics network element; and the second statistical information is obtained by performing statistical analytics on behavior information of a terminal device in the location area managed by the security analytics network element, the second abnormal behavior prediction result is obtained by performing abnormal behavior prediction on the behavior information of the terminal device in the location area managed by the security analytics network element, the security classification result of the location area managed by the security analytics network element is determined based on the behavior information of the terminal device in the location area managed by the security analytics network element, and the location area managed by the security analytics network element corresponds to the target location area.

With reference to the fourth aspect, in some implementations of the fourth aspect, the transceiver unit is further configured to send a security analytics request message to the security analytics network element based on the target location area, where the security analytics request message is used to request the security analytics network element to perform security analytics on the managed location area.

With reference to the fourth aspect, in some implementations of the fourth aspect, the transceiver unit is further configured to send the security classification result of the location area managed by the security analytics network element to the security analytics network element.

With reference to the fourth aspect, in some implementations of the fourth aspect, the security analytics request message further includes an analytics identifier, the second information further includes the analytics identifier, and the analytics identifier identifies security analytics performed on the target location area.

With reference to the fourth aspect, in some implementations of the fourth aspect, the communication apparatus further includes a transceiver unit, where the transceiver unit is configured to receive third information from a first network element, where the third information indicates to perform security analytics on all location areas in a PLMN in which the security function network element is located; and the processing unit is further configured to determine, based on the third information, to perform security analytics on all the location areas in the PLMN, where all the location areas in the PLMN include the target location area.

The first network element may be a policy control function network element, a unified data management network element, an application function network element, or the like.

With reference to the fourth aspect, in some implementations of the fourth aspect, the third information includes an identifier of each of all the location areas in the PLMN.

With reference to the fourth aspect, in some implementations of the fourth aspect, the communication apparatus further includes a transceiver unit, where the transceiver unit is configured to receive an identifier of the target location area from a first network element; and the processing unit is further configured to determine, based on the identifier of the target location area, to perform security analytics on the target location area.

With reference to the fourth aspect, in some implementations of the fourth aspect, the communication apparatus further includes a transceiver unit, where the transceiver unit is configured to receive a security policy request message, where the security policy request message includes location area information of a first terminal device, and the location area information of the first terminal device indicates that the first terminal device is located in the target location area; and the transceiver unit is further configured to send a security protection mode determined for the first terminal device, where the security protection mode is determined based on the security classification result of the target location area.

With reference to the fourth aspect, in some implementations of the fourth aspect, the communication apparatus further includes a transceiver unit, where the transceiver unit is configured to receive a first identifier of a first terminal device and location area information of the first terminal device, where the location area information of the first terminal device indicates that the first terminal device is located in the target location area; the processing unit is further configured to determine, based on the first identifier of the first terminal device, that a security enhancement service is allowed to be performed on the first terminal device; and the processing unit is further configured to determine, based on the location area information of the first terminal device, to perform security analytics on the target location area.

With reference to the fourth aspect, in some implementations of the fourth aspect, the transceiver unit is configured to receive a second identifier of the first terminal device from a first network element; and the processing unit is further configured to determine, based on a correspondence between the first identifier of the first terminal device and the second identifier of the first terminal device, that the security enhancement service is allowed to be performed on the first terminal device.

With reference to the fourth aspect, in some implementations of the fourth aspect, the processing unit is further configured to determine that security analytics is allowed to be performed on the target location area.

With reference to the fourth aspect, in some implementations of the fourth aspect, the transceiver unit is further configured to receive an identifier of the target location area from the first network element; and the processing unit is further configured to determine, based on a correspondence between the location area information of the first terminal device and the identifier of the target location area, that security analytics is allowed to be performed on the target location area.

With reference to the fourth aspect, in some implementations of the fourth aspect, the transceiver unit is further configured to send a security protection mode determined for the first terminal device, where the security protection mode is determined based on the security classification result of the target location area.

With reference to the fourth aspect, in some implementations of the fourth aspect, the processing unit is further configured to determine to perform security analytics on the target location area for a target attack, where the security classification result of the target location area includes a security classification result of the target location area for the target attack, and the security classification result of the target location area for the target attack indicates a degree to which the potential target attack exists in the target location area.

With reference to the fourth aspect, in some implementations of the fourth aspect, the communication apparatus further includes a transceiver unit, where the transceiver unit is configured to receive an identifier of the target attack from the first network element; and the processing unit is further configured to determine, based on the identifier of the target attack, to perform security analytics on the target location area for the target attack.

With reference to the fourth aspect, in some implementations of the fourth aspect, the communication apparatus further includes a transceiver unit, where the transceiver unit is further configured to send a first mapping relationship to a policy control function network element or a unified data management network element, where the first mapping relationship includes the identifier of the target location area and the security classification result of the target location area.

According to a fifth aspect, a communication apparatus is provided. The communication apparatus includes a transceiver unit and a processing unit, where the processing unit is configured to determine to perform security analytics on a target location area; the transceiver unit is configured to send a first security analytics request message to a security analytics network element, where the first security analytics request message includes an identifier of the target location area; and the transceiver unit is further configured to receive a security classification result that is of the target location area and that is from the security analytics network element, where the security classification result indicates a degree to which a potential attack exists in the target location area.

With reference to the fifth aspect, in some implementations of the fifth aspect, the processing unit is further configured to determine to perform security analytics on the target location area for a target attack, where the first security analytics request message further includes an identifier of the target attack; and the security classification result of the target location area includes a security classification result of the target location area for the target attack, and the security classification result of the target location area for the target attack indicates a degree to which the potential target attack exists in the target location area.

With reference to the fifth aspect, in some implementations of the fifth aspect, the transceiver unit is further configured to receive third information from an application function network element, where the third information indicates to perform security analytics on all location areas in a PLMN; and the processing unit is further configured to determine, based on the third information, to perform security analytics on all the location areas in the PLMN, where all the location areas in the PLMN include the target location area.

With reference to the fifth aspect, in some implementations of the fifth aspect, the third information includes an identifier of each of all the location areas in the PLMN.

With reference to the fifth aspect, in some implementations of the fifth aspect, the transceiver unit is further configured to receive an identifier of the target location area from an application function network element; and the processing unit is further configured to determine, based on the identifier of the target location area, to perform security analytics on the target location area.

With reference to the fifth aspect, in some implementations of the fifth aspect, the transceiver unit is further configured to receive the identifier of the target attack from an application function network element; and the processing unit is further configured to determine, based on the identifier of the target attack, to perform security analytics on the target location area for the target attack.

With reference to the fifth aspect, in some implementations of the fifth aspect, before sending the first security analytics request message to the security analytics network element, the transceiver unit is further configured to receive a first identifier of a first terminal device and location area information of the first terminal device, where the location area information of the first terminal device indicates that the first terminal device is located in the target location area; and the processing unit is further configured to determine, based on the first identifier of the first terminal device, that a security enhancement service is allowed to be performed on the first terminal device.

With reference to the fifth aspect, in some implementations of the fifth aspect, the transceiver unit is further configured to receive a second identifier of the first terminal device from an application function network element; and the processing unit is further configured to determine, based on a correspondence between the first identifier of the first terminal device and the second identifier of the first terminal device, that the security enhancement service is allowed to be performed on the first terminal device.

With reference to the fifth aspect, in some implementations of the fifth aspect, the transceiver unit is further configured to send a security protection mode determined for the first terminal device, where the security protection mode is determined based on the security classification result of the target location area.

According to a sixth aspect, a communication apparatus is provided. The communication apparatus includes a transceiver unit and a processing unit, where the transceiver unit is configured to receive a first security analytics request message from a policy control function network element or a unified data management network element, where the first security analytics request message includes an identifier of a target location area; the processing unit is configured to determine a security classification result of the target location area based on first information, where the security classification result indicates a degree to which a potential attack exists in the target location area, the first information is related to behavior information of a terminal device in the target location area, and the behavior information includes location traffic data and/or movement track information; and the transceiver unit is further configured to send a first mapping relationship to the policy control function network element or the unified data management network element, where the first mapping relationship includes the identifier and the security classification result of the target location area.

With reference to the sixth aspect, in some implementations of the sixth aspect, the first security analytics request message further includes an identifier of a target attack, the security classification result of the target location area includes a security classification result of the target location area for the target attack, and the security classification result of the target location area for the target attack indicates a degree to which the potential target attack exists in the target location area.

With reference to the sixth aspect, in some implementations of the sixth aspect, the first information includes the behavior information of the terminal device in the target location area, and the processing unit is further configured to: perform statistical analytics on the behavior information of the terminal device in the target location area to obtain first statistical information; and/or perform abnormal behavior prediction on the behavior information of the terminal device in the target location area to obtain a first abnormal behavior prediction result; and determine the security classification result of the target location area based on the first statistical information and/or the first abnormal behavior prediction result.

With reference to the sixth aspect, in some implementations of the sixth aspect, the transceiver unit is further configured to send a data collection request message to a data collection network element in the target location area, where the data collection request message is used to request behavior information of a terminal device served by the data collection network element; and the transceiver unit is further configured to receive, from the data collection network element, the behavior information of the terminal device served by the data collection network element.

With reference to the sixth aspect, in some implementations of the sixth aspect, the data collection request message further includes a first time interval parameter and/or a first threshold, the first time interval parameter indicates a periodicity for reporting the behavior information of the terminal device, and the first threshold indicates a minimum value or a maximum value for triggering reporting of the behavior information of the terminal device.

With reference to the sixth aspect, in some implementations of the sixth aspect, the first information includes second information sent by a distributed security analytics network element, and the second information includes second statistical information, a second abnormal behavior prediction result, and/or a security classification result of a location area managed by the distributed security analytics network element; and the second statistical information is obtained by performing statistical analytics on behavior information of a terminal device in the location area managed by the distributed security analytics network element, the second abnormal behavior prediction result is obtained by performing abnormal behavior prediction on the behavior information of the terminal device in the location area managed by the distributed security analytics network element, the security classification result of the location area managed by the distributed security analytics network element is determined based on the behavior information of the terminal device in the location area managed by the distributed security analytics network element, and the location area managed by the distributed security analytics network element corresponds to the target location area.

With reference to the sixth aspect, in some implementations of the sixth aspect, the transceiver unit is further configured to send a second security analytics request message to the distributed security analytics network element based on the target location area, where the second security analytics request message is used to request the distributed security analytics network element to perform security analytics on the managed location area.

With reference to the sixth aspect, in some implementations of the sixth aspect, the transceiver unit is further configured to send, to the distributed security analytics network element, the security classification result of the location area managed by the distributed security analytics network element.

With reference to the sixth aspect, in some implementations of the sixth aspect, the second security analytics request message further includes an analytics identifier, the second information further includes the analytics identifier, and the analytics identifier identifies security analytics performed on the target location area.

According to a seventh aspect, a communication apparatus is provided. The apparatus includes a processor. The processor is coupled to a memory, and may be configured to execute instructions in the memory, to implement the method according to any one of the first aspect and the possible implementations of the first aspect. For example, the communication apparatus further includes the memory. For example, the communication apparatus further includes a communication interface, and the processor is coupled to the communication interface.

In an implementation, the communication apparatus is a security function network element. When the communication apparatus is the security function network element, the communication interface may be a transceiver or an input/output interface.

In another implementation, the communication apparatus is a chip configured in the security function network element. When the communication apparatus is the chip configured in the security function network element, the communication interface may be an input/output interface.

For example, the transceiver may be a transceiver circuit. For example, the input/output interface may be an input/output circuit.

According to an eighth aspect, a communication apparatus is provided. The apparatus includes a processor. The processor is coupled to a memory, and may be configured to execute instructions in the memory, to implement the method according to any one of the second aspect and the possible implementations of the second aspect. For example, the communication apparatus further includes the memory. For example, the communication apparatus further includes a communication interface, and the processor is coupled to the communication interface.

In an implementation, the communication apparatus is a policy control function network element or a unified data management network element. When the communication apparatus is the policy control function network element or the unified data management network element, the communication interface may be a transceiver or an input/output interface.

In another implementation, the communication apparatus is a chip configured in the policy control function network element or the unified data management network element. When the communication apparatus is the chip configured in the policy control function network element or the unified data management network element, the communication interface may be an input/output interface.

For example, the transceiver may be a transceiver circuit. For example, the input/output interface may be an input/output circuit.

According to a ninth aspect, a communication apparatus is provided. The apparatus includes a processor. The processor is coupled to a memory, and may be configured to execute instructions in the memory, to implement the method according to any one of the third aspect and the possible implementations of the third aspect. For example, the communication apparatus further includes the memory. For example, the communication apparatus further includes a communication interface, and the processor is coupled to the communication interface.

In an implementation, the communication apparatus is a security analytics network element. When the communication apparatus is the security analytics network element, the communication interface may be a transceiver or an input/output interface.

In another implementation, the communication apparatus is a chip configured in the security analytics network element ment. When the communication apparatus is the chip configured in the security analytics network element, the communication interface may be an input/output interface.

For example, the transceiver may be a transceiver circuit. For example, the input/output interface may be an input/output circuit.

According to a tenth aspect, a processor is provided. The processor includes an input circuit, an output circuit, and a processing circuit. The processing circuit is configured to: receive a signal through the input circuit; and transmit a signal through the output circuit, so that the processor is enabled to perform the method according to any possible implementation of the first aspect to the third aspect.

In an implementation, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to an eleventh aspect, a processing apparatus is provided. The processing apparatus includes a processor and a memory. The processor is configured to: read instructions stored in the memory; receive a signal through a receiver; and transmit a signal through a transmitter, to perform the method according to any possible implementation of the first aspect to the third aspect.

For example, there are one or more processors, and there are one or more memories.

For example, the memory may be integrated with the processor, or the memory and the processor are separately disposed.

In an implementation process, the memory may be a non-transitory memory, for example, a read-only memory (ROM). The memory and the processor may be integrated into one chip, or may be separately disposed on different chips. A type of the memory and a manner in which the memory and the processor are disposed are not limited in embodiments of this application.

A related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eleventh aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a twelfth aspect, a computer program product is provided. The computer program product includes a computer program (which may also be referred to as code or instructions). When the computer program is run, a computer is enabled to perform the method according to any possible implementation of the first aspect to the third aspect.

According to a thirteenth aspect, a computer-readable storage medium is provided. The computer-readable storage medium stores a computer program (which may also be referred to as code or instructions). When the computer program is run on a computer, the method according to any possible implementation of the first aspect to the third aspect is implemented.

According to a fourteenth aspect, a communication system is provided. The communication system includes the foregoing security function network element, or includes the foregoing policy control function network element and security analytics network element, or includes the foregoing unified data management network element and security analytics network element.

BRIEF DESCRIPTION OF DRAWINGS

FIG. 7 is a schematic flowchart of a method according to still another embodiment of this application;

FIG. 8 is a schematic block diagram of a communication apparatus according to an embodiment of this application;

DESCRIPTION OF EMBODIMENTS

Figures 1, 2, 3:
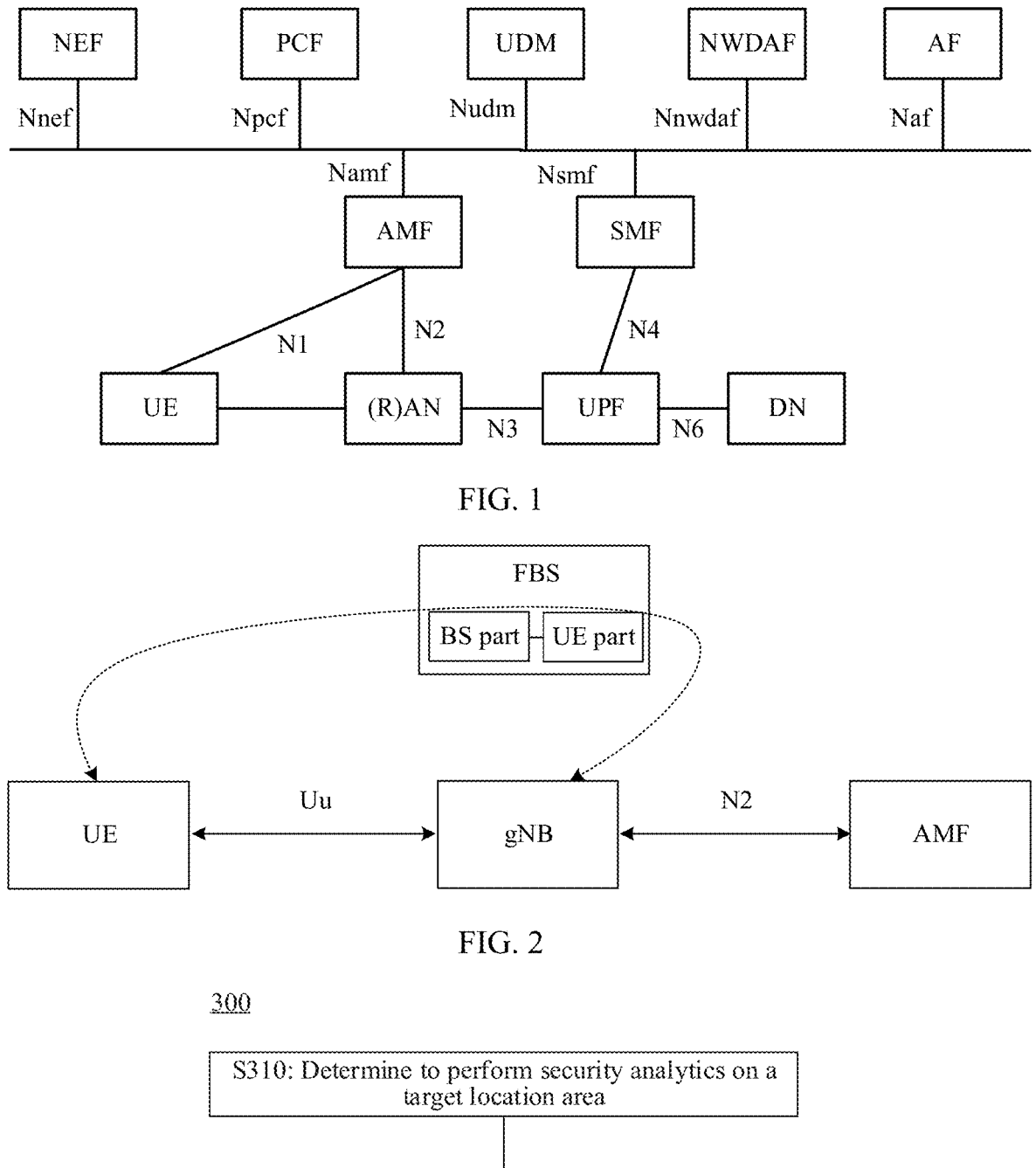
FIG. 1 is a schematic diagram of a communication system to which a method according to an embodiment of this application is applicable.
FIG. 2 is a schematic diagram of a fake base station attack.
FIG. 3 is a schematic flowchart of a method according to an embodiment of this application.

The following describes technical solutions of this application with reference to accompanying drawings.

The technical solutions in embodiments of this application can be applied to various communication systems, for example, a long term evolution (LTE) system, a frequency division duplex (FDD) system, a time division duplex (TDD) system, a universal mobile telecommunications system (UMTS), a worldwide interoperability for microwave access (WiMAX) communication system, a 5G system, a new radio (NR) system, a 6th generation (6G) system, a future communication system, or the like. The 5G mobile communication system in this application includes a non-standalone (NSA) 5G mobile communication system or a standalone (SA) 5G mobile communication system. The communication system may alternatively be a public land mobile network (PLMN), a device-to-device (D2D) communication system, a machine to machine (M2M) communication system, an internet of things (IoT) communication system, a vehicle to everything (V2X) communication system, an uncrewed aerial vehicle (UAV) communication system, or another communication system.

The following describes the technical solutions in embodiments of this application with reference to the accompanying drawings in embodiments of this application. In the descriptions of this application, unless otherwise specified, "/" indicates that associated objects are in an "or" relationship. For example, A/B may represent A or B. In this application, "and/or" describes only an association relationship between associated objects and represents that three relationships may exist. For example, A and/or B may indicate: Only A exists, both A and B exist, and only B exists, where A and B may be singular or plural. In addition, in the descriptions of this application, "a plurality of" means two or more, unless otherwise specified. "At least one of the following items (pieces)" or a similar expression thereof means any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, terms such as "example" or "for example" are used to represent giving an example, an illustration, or a description. Any embodiment or design scheme described as an "example" or with "for example" in embodiments of this application should not be explained as being more preferred or having more advantages than another embodiment or design scheme. Use of the terms, such as, "example" or "for example" is intended to present a related concept in a more definite manner for ease of understanding.

In addition, a network architecture and a service scenario described in embodiments of this application are intended to describe the technical solutions in embodiments of this application more clearly, and do not constitute any limitation on the technical solutions provided in embodiments of this application. A person of ordinary skill in the art may know that: With evolution of the network architecture and emergence of a new service scenario, the technical solutions provided in embodiments of this application are also applicable to similar technical problems.

For ease of understanding of embodiments of this application, an application scenario of embodiments of this application is first described in detail with reference to FIG. 1.

1. A user equipment (UE) may be referred to as a terminal device, a terminal, an access terminal, a subscriber unit, a subscriber station, a mobile station, a remote station, a remote terminal, a mobile device, a user terminal, a wireless communication device, a user agent, or a user apparatus. The terminal device may alternatively be a cellular phone, a cordless phone, a session initiation protocol (SIP) phone, a wireless local loop (WLL) station, a personal digital processor (PDA), a handheld device having a wireless communication function, a computing device or another processing device connected to a wireless modem, a vehicle-mounted device, an uncrewed aerial vehicle, a wearable device, a terminal device in a 5G network, a terminal device in an evolved PLMN, or the like. This is not limited in embodiments of this application.

2. An access network (AN) provides a network access function for an authorized user in an area, and can use transmission tunnels with different quality based on user levels, service requirements, and the like. The access network may be an access network using different access technologies. Conventional access network technologies include: a radio access network technology used in a 3rd generation (3G) system, a radio access network technology used in a 4th generation (4G) system, or a next generation radio access network (NG-RAN) technology (for example, a radio access network technology used in a 5G system).

An access network that implements an access network function based on a wireless communication technology may be referred to as a radio access network (RAN). The radio access network can manage radio resources, provide an access service for a terminal, and further complete forwarding of a control signal and user data between a terminal and a core network.

The radio access network device may be, for example, a base station (NodeB), an evolved NodeB (eNB or eNodeB), a next generation node base station (gNB) in a 5G mobile communication system, a base station in a future mobile communication system, an access point (AP) in a Wi-Fi wireless hotspot system, or the like; or may be a radio controller in a cloud radio access network (CRAN) scenario. Alternatively, the radio access network device may be a relay station, an access point, a vehicle-mounted device, an uncrewed aerial vehicle, a wearable device, a network device in a 5G network, a network device in an evolved PLMN, or the like. A specific technology and a specific device form that are used by the radio access network device are not limited in embodiments of this application.

3. An access management network element is mainly used for mobility management and access management, is responsible for transferring a user policy between user equipment and a policy control function (PCF) network element, and may be configured to implement a function other than session management in a mobility management entity (MME) function, for example, an access authorization (authentication) function.

In a 5G communication system, the access management network element may be an access and mobility management function (AMF) network element. In a future communication system, the access management network element may still be the AMF network element, or may have another name. This is not limited in this application.

4. A session management network element is mainly configured to: manage a session, assign and manage an internet protocol (IP) address of a user equipment, select an endpoint that can manage a user plane function interface and a policy control and charging function interface, perform downlink data communication, and the like.

In the 5G communication system, the session management network element may be a session management function (SMF) network element. In a future communication system, the session management network element may still be the SMF network element, or may have another name. This is not limited in this application.

5. A user plane network element is configured to: perform packet routing and forwarding, perform quality of service (QoS) processing on user plane data, complete user plane data forwarding, perform session/flow-level charging statistics collection, implement a bandwidth limiting function, and the like.

In the 5G communication system, the user plane network element may be a user plane function (UPF) network element. In a future communication system, the user plane network element may still be the UPF network element, or may have another name. This is not limited in this application.

6. A data network element is configured to provide a network for data transmission.

In the 5G communication system, the data network element may be a data network (DN) network element. In a future communication system, the DN network element may still be the DN network element, or may have another name. This is not limited in this application.

7. A policy control network element is configured to: provide guidance on a unified policy framework for network behavior, provide policy rule information for a control plane function network element (for example, an AMF or SMF network element), and the like.

In a 4G communication system, the policy control network element may be a policy and charging rules function (PCRF) network element. In the 5G communication system, the policy control network element may be a policy control function (PCF) network element. In a future communication system, the policy control network element may still be the PCF network element, or may have another name. This is not limited in this application.

8. A data management network element is used for user equipment identifier processing, access authentication, registration, mobility management, and the like.

In the 5G communication system, the data management network element may be a unified data management (UDM) network element. In a 4G communication system, the data management network element may be a home subscriber server (HSS) network element. In a future communication system, the data management network element may still be the UDM network element, or may have another name. This is not limited in this application.

9. A network exposure function (NEF) entity is configured to securely expose, to the outside, a service, a capability, and the like that are provided by a 3rd generation partnership project (3GPP) network function.

10. An application function (AF) network element provides an application layer service for the UE. When providing the service for the UE, the AF has a requirement on a QoS policy and a charging policy, and needs to notify a network. In addition, the AF further needs to obtain application-related information fed back by the core network. The AF may have all functions of the AF defined in the 23.501 R-15 version, and have related functions for application services. In other words, in a user plane architecture, an application server and the UE perform user plane communication through a UE-RAN-UPF-AF path. The AF may further communicate with another network function (NF) in a 5G core network (5GC) through the NEF in a control plane architecture, for example, communicate with the PCF through the NEF. If the AF is arranged by an operator of the 5GC, the AF may further directly communicate with another NF in the 5GC without using the NEF in the control plane architecture, for example, directly communicate with the PCF.

11. Network data analytics function (NWDAF) network element:

In the 5G era, many new service scenarios need to provide differentiated services. Therefore, differentiated requirements for a service level agreement (SLA) are proposed. This complicates network operations. With development of 5G network capabilities and rich services, service experience will be diversified and personalized.

5G networks still lack sufficient intelligence to provide on-demand services and improve network resource utilization to satisfy complexity of future communication scenarios, diversified service requirements, and personalized service experience. Therefore, the 3GPP introduces artificial intelligence (AI) into 5G networks and adds a network function, namely, an NWDAF.

The NWDAF is mainly configured to analyze various types of network data, including network running data collected from the NF, statistical data that is related to a terminal and a network and that is obtained from an operation administration and maintenance (OAM) system, and application data obtained from a third-party AF. An analytics result generated by the NWDAF is also output to the NF, the OAM, or the third-party AF.

The NF, the OAM, or the AF may perform different optimization operations by using the analytics result of the NWDAF.

A 5G mobility management related function (for example, the AMF) may request the NWDAF to predict a movement track of a terminal. The NWDAF obtains historical location information of the terminal from the OAM, and generates a mobility prediction model of the terminal by analyzing the historical location information of the terminal. The NWDAF provides mobility prediction information of the terminal for the 5G mobility management related function based on a current location of the terminal, so that the 5G mobility management related function can formulate a more accurate network policy based on the mobility prediction information of the terminal, to complete an optimized mobility management operation. For example, registration area allocation is performed according to a terminal location statistical rule, handover decision-making is assisted based on terminal location prediction information, and mobility anchor preselection is performed based on a terminal mobility track.

The OAM in the 5G network may also request the NWDAF to provide an analytics result of service running data in a network slice, to optimize management of network slice resources. The NWDAF may provide the OAM with information about whether each slice satisfies the SLA and user experience distribution statuses in the slices. The OAM system determines, based on the analytics result of the NWDAF, whether to adjust resource allocation of each network slice.

The third-party AF can subscribe to network performance prediction information from the NWDAF and adjust an application layer based on the prediction information. The network performance prediction information may be QoS prediction of service data transmission or load prediction of a network that serves the terminal. The NWDAF provides an analytics or prediction result to the AF periodically or as required based on a subscription request of the AF, so that the AF can adjust its running parameter. For example, based on the QoS prediction, a vehicle to everything application may select different driving levels or determine whether to download a map or navigation data in advance, or may select a transmission occasion of background traffic based on the network load prediction.

In FIG. 1, N1, N2, N3, N4, N6, Nnwdaf, Nnef, Npcf, Nudm, Naf, Namf, and Nsmf are interface serial numbers. For meanings of the interface serial numbers, refer to meanings defined in 3GPP technical standards (TS) 23.501.

The foregoing network architecture applied to embodiments of this application is merely an example for description, and a network architecture applicable to embodiments of this application is not limited thereto. Any network architecture that can implement the functions of the foregoing network elements is applicable to embodiments of this application.

It should be further understood that the AMF, SMF, UPF, NEF, PCF, UDM, NWDAF, and the like shown in FIG. 1 may be understood as network elements configured to implement different functions in the core network, for example, may be combined as required to form a network slice. The core network elements may be independent devices, or may be integrated into a same device to implement different functions. A specific form of the foregoing network elements is not limited in this application.

It should be further understood that the foregoing names are defined merely for distinguishing between different functions, and should not constitute any limitation on this application. This application does not exclude a possibility that another name is used in the 5G network and another future network. For example, in a 6G network, some or all of the foregoing networks may still use terms in 5G, or may use other names. The names of the interfaces between the network elements in FIG. 1 are merely examples and may be named differently. This is not limited in this application. In addition, names of messages (or signaling) transmitted between the foregoing network elements are merely examples, and do not constitute any limitation on functions of the messages.

A security protection enabling mode needs to be determined according to a security protection policy. A security protection policy includes three types: enabled (REQUIRED), not enabled (NOT NEEDED), and optional (PREFERRED). REQUIRED indicates that security protection needs to be enabled, NOT NEEDED indicates that security protection does not need to be enabled, and PREFERRED indicates that security protection is enabled for a preference, security protection may be enabled, or may not be enabled. Further, when the security protection policy is combined with a control plane and a user plane, the security protection policies are further classified into a control plane security protection policy and a user plane security protection policy. Each of the control plane security protection policy and the user plane security protection policy has three types: REQUIRED, NOT NEEDED, and PREFERRED.

The security protection policy in the 5G network relates to two scenarios: a security protection policy used on a Uu interface between a UE and a RAN, and a security protection policy used on a PC5 interface directly connected between UEs.

For the security protection policy on the Uu interface (where security protection on the Uu interface is referred to as Uu security protection for short below), a UDM on a network side stores a security protection policy corresponding to a service subscribed by a UE. The security protection policy is a service granularity, in other words, there is no association relationship between the Uu security protection policy and a geographical location of the UE.

For a unicast security protection policy on the PC5 interface (where unicast security protection on the PC5 interface is referred to as PC5 security protection for short below), in an existing 5G V2X standard, a UE obtains a PC5 security protection policy at a V2X service granularity from a PCF. The PCF sends a correspondence between security protection policies of a V2X service at different geographical locations to the UE, that is, the PC5 security protection policy is determined based on a geographical location of the UE.

In a 5G mobile network, an attacker also has a mobility capability, and may move to different geographical locations to attack a network or a UE, threatening security and privacy of the UE. For example, in a fake base station (FBS) attack, a fake base station is an attacker of a man-in-the-middle (MITM) attack. As shown in FIG. 2, a UE and a base station are connected through a Uu interface, and RRC signaling and user plane data may be transmitted between the UE and the base station. The base station and an AMF are connected through an N2 interface, and communicate with each other by using an N2 interface protocol. An attacker may deploy a fake base station to attract a terminal to camp on the fake base station. The fake base station includes a base station part and a fake UE part. An attack manner is shown by a dashed line in FIG. 2: The base station part of the fake base station obtains a cell identifier of a nearby genuine base station, uses the cell identifier of the genuine base station as a disguise to approach a UE, and broadcasts system messages such as a master information block (MIB) and a system information block (SIB) to assist the UE in accessing the fake base station. The fake base station can change cell selection information in the SIB message to increase an access threshold, to enable a terminal to easily camp on the fake base station. In this case, the fake UE part of the fake base station may forward or modify some information about the genuine UE camping on the fake base station, access a genuine base station as the genuine UE, and communicate with an AMF by using an N2 interface protocol. In this way, communication content between a genuine terminal and a network can be sniffed, tampered with, or forged. A fake base station device is similar to a laptop in size and is easy to move. Therefore, an attacker can randomly move to different locations to launch attacks.

As described above, when an attacker can randomly move to different locations to launch attacks, because a Uu security protection policy is not associated with a geographical location of a UE, the Uu security protection policy may not ensure secure communication between UEs at different locations and a network. In addition, although a PC5 security protection policy is determined based on a geographical location of a UE, when an attacker can move randomly, the PC5 security protection policy may not ensure security of a PC5 interface.

In view of this, this application provides a method for obtaining a security classification result, to obtain security classification results of different location areas, so as to help adjust, based on the security classification results of the different location areas, a security protection mode used by a UE.

FIG. 3 shows a method for obtaining a security classification result according to an embodiment of this application. As shown in FIG. 3, the method 300 may include S310 and S320. The following describes the steps in detail.

S310: A security function network element determines to perform security analytics on a target location area.

The security function network element is a network element having a security analytics function. For example, the security function network element may be a network element completely responsible for security analytics. Alternatively, the security function network element may be a network element having some security-related functions. The security-related functions are, for example, determining a security policy used by a terminal device or a network element, storing the security policy of the terminal device or the network element, and storing a security capability of the terminal device or the network element. For example, the security function network element is a policy control function network element, a unified data management network element, or a security analytics network element. The security analytics network element may be a network data analytics function network element, or may be a function network element that performs security-related analytics on network data depending on an artificial intelligence technology.

For example, performing security analytics on the target location area means obtaining a security classification result of the target location area, where the security classification result of the target location area indicates a degree to which a potential attack exists in the target location area.

The security classification result of the target location area may include only one security classification result, or may include a plurality of security classification results. When the security classification result of the target location area includes only one security classification result, the security classification result of the target location area corresponds to one or more attacks. The security classification result of the target location area may indicate a degree to which the one or more potential attacks exist in the target location area. When the security classification result of the target location area includes a plurality of security classification results, each of the plurality of security classification results corresponds to one or more attacks, and each security classification result corresponds to a different attack. For example, the security classification result of the target location area includes two security classification results, where the two security classification results respectively correspond to an attack #1 and an attack #2, the security classification result corresponding to the attack #1 indicates a degree to which the potential attack #1 exists in the target location area, and the security classification result corresponding to the attack #2 indicates a degree to which the potential attack #2 exists in the target location area.

Optionally, the security classification result of the target location area indicates security of the target location area. It may be understood that the security of the target location area is inversely related to the degree to which the potential attack exists in the target location area. If the degree to which the potential attack exists in the target location area is high, the security of the target location area is low; or if the degree to which the potential attack exists in the target location area is low, the security of the target location area is high.

Content of the security classification result is not limited in embodiments of this application.

For example, the content of the security classification result may be high, medium, or low. For example, when the security classification result indicates security of a location, if the degree to which the potential attack exists in the target location area is low, the content of the security classification result of the target location area is high; if the degree to which the potential attack exists in the target location area is medium, the content of the security classification result of the target location area is medium; or if the degree to which the potential attack exists in the target location area is high, the content of the security classification result of the target location area is low. For another example, when the security classification result indicates the degree to which the potential attack exists in the target location area, if the degree to which the potential attack exists in the target location area is low, the content of the security classification result of the target location area is low; if the degree to which the potential attack exists in the target location area is medium, the content of the security classification result of the target location area is medium; or if the degree to which the potential attack exists in the target location area is high, the content of the security classification result of the target location area is high.

In another example, the content of the security classification result may be that security enhancement is required or security enhancement is not required. For example, if the degree to which the potential attack exists in the target location area is high, the security classification result of the target location area is that security enhancement is required; or if the degree to which the potential attack exists in the target location area is low, the security classification result of the target location area is that security enhancement is not required.

In another example, the content of the security classification result may be a probability that a potential attack exists. For example, if the probability that the potential attack exists in the target location area is 70%, the security classification result of the target location area is also 70%.

How the security function network element determines to perform security analytics on the target location area is not limited in embodiments of this application.

In a possible implementation, the security function network element determines, by default, to perform security analytics on all location areas in a PLMN in which the security function network element is located (the PLMN in which the security function network element is located is denoted as a first PLMN below), and all the location areas in the first PLMN include the target location area. Optionally, the security function network element performs security analytics on all the location areas in the PLMN in which the security function network element is located.

In another possible implementation, the security function network element determines, by default, to perform security analytics on all location areas served by the security function network element, and all the location areas served by the security function network element include the target location area. The security function network element determines, based on pre-configured information, information about a location served by the security function network element. It should be noted that, all location areas in a first PLMN include all the location areas served by the security function network element, and may further include a location area that is not served by the security function network element. Optionally, after the security function network element determines to perform security analytics on all the location areas served by the security function network element, the security function network element performs security analytics on all the location areas served by the security function network element.

In still another possible implementation, the security function network element receives third information from a first network element, where the third information indicates to perform security analytics on all location areas in a first PLMN; and the security function network element determines, based on the third information, to perform security analytics on all the location areas in the first PLMN, where all the location areas in the first PLMN include the target location area. Optionally, after the security function network element determines to perform security analytics on all the location areas in the first PLMN, the security function network element performs security analytics on all the location areas in the first PLMN. For example, the first network element is a policy control function network element, a unified data management network element, or an application function network element.

For example, the third information includes a first identifier of each of all the location areas in the first PLMN. Correspondingly, the security function network element determines, based on the first identifier of each of all the location areas in the first PLMN, to perform security analytics on all the location areas in the first PLMN. The first identifier of the location area may include one or more of the following: coordinate information, a geographic area identifier (geographical area identifier), address information, a TAI, and a cell ID. It should be noted that first identifiers of different location areas in the first PLMN are different.

For another example, the third information is 1-bit information. When the third information is "0", the third information indicates to perform security analytics on all the location areas in the first PLMN; or when the third information is "1", the third information indicates to perform security analytics on all the location areas in the first PLMN. Correspondingly, the security function network element determines, based on a value of the third information, whether to perform security analytics on all the location areas in the first PLMN.

In another example, the third information includes a first identifier of a preset first location area. Correspondingly, the security function network element determines, based on the first identifier of the preset location area, to perform security analytics on all the location areas in the first PLMN. For example, if the preset location area is a location area #A, when the third information includes a first identifier of the location area #A, the security function network element determines to perform security analytics on all the location areas in the first PLMN.

In another example, the first network element is an application function network element, the third information includes a security protection policy of a first service, and the first service is a service supported by the application function network element. Correspondingly, after receiving the security protection policy of the first service, the security function network element determines to perform security analytics on all the location areas in the first PLMN.

In yet another possible implementation, the security function network element receives fourth information from a first network element, where the fourth information indicates to perform security analytics on all location areas served by the security function network element; and the security function network element determines, based on the fourth information, to perform security analytics on all the served location areas.

For example, the fourth information includes a first identifier of each of all the location areas served by the security function network element. Correspondingly, the security function network element determines, based on the first identifier of each of all the location areas served by the security function network element, to perform security analytics on all the served location areas. It should be noted that identifiers of different location areas served by the security function network element are different.

For another example, the fourth information is 1-bit information. When the fourth information is "0", the fourth information indicates to perform security analytics on all the location areas served by the security function network element; or when the fourth information is "1", the fourth information indicates to perform security analytics on all the location areas served by the security function network element. Correspondingly, the security function network element determines, based on a value of the fourth information, whether to perform security analytics on all the served location areas.

In another example, the fourth information includes a first identifier of a preset second location area, and the second location area belongs to the location areas served by the security function network element. Correspondingly, the security function network element determines, based on the first identifier of the preset second location area, to perform security analytics on all the served location areas. For example, if the preset second location area is a location area #B, when the fourth information includes a first identifier of the location area #B, the security function network element determines to perform security analytics on all the served location areas.

In yet another possible implementation, the security function network element receives a first identifier of the target location area from a first network element; and the security function network element determines, based on the first identifier of the target location area, to perform security analytics on the target location area. Optionally, the security function network element performs security analytics on the target location area corresponding to the first identifier. For example, when the first identifier of the target location area is an identifier used outside a network, the first identifier of the target location area may be coordinate information, a geographical area identifier, or address information; or when the first identifier of the target location area is an identifier used inside a network, the first identifier of the target location area may be a TAI or a cell ID.

In yet another possible implementation, a second identifier of the target location area is pre-configured in the security function network element, the pre-configured information indicates to perform security analytics on the target location area, and the security function network element determines, based on the pre-configured second identifier of the target location area, to perform security analytics on the target location area.

The second identifier of the location area includes one or more of the following: coordinate information, a geographic area identifier, address information, a TAI, and a cell ID. The first identifier of the location area is different from the second identifier of the location area, or the first identifier of the location area is the same as the second identifier of the location area. This is not limited in embodiments of this application. For example, the second identifier of the target location area is an identifier used inside a network.

In yet another possible implementation, the security function network element receives a first identifier of a first terminal device and location area information of the first terminal device, where the location area information of the first terminal device indicates that the first terminal device is located in the target location area; the security function network element determines, based on the first identifier of the first terminal device, that a security enhancement service is allowed to be performed on the first terminal device; and the security function network element determines, based on the location information of the first terminal device, to perform security analytics on the target location area in which the first terminal device is located.

Security analytics is performed on the location area in which the terminal device on which the security enhancement service is allowed to be performed is located, but security analytics is not performed on all the location areas. This can reduce signaling used for data collection and a processing burden of the security function network element.

For example, that the security enhancement service is allowed to be performed on the first terminal device means that a security protection policy used by the first terminal device is allowed to be determined based on a security classification result of the location area in which the first terminal device is located.

The first identifier of the terminal device includes one or more of the following: an IP address, an SUPI, a PEI, a GPSI, an IMSI, an IMEI, and an IP address and an MSISD. For example, the first identifier of the terminal device is an identifier used inside a network. For example, the first identifier of the terminal device includes one or both of the following: an SUPI and a GPSI.

The location area information of the first terminal device includes a first identifier of a location area in which the first terminal device is located or a second identifier of the location area in which the first terminal device is located. For example, the location area information of the first terminal device includes an ID of a cell accessed by the first terminal device and/or a TAI of the first terminal device.

For example, that the security function network element determines that a security enhancement service is allowed to be performed on the first terminal device includes: The first identifier of the first terminal device is pre-configured in the security function network element, where the pre-configured information indicates that the security enhancement service is allowed to be performed on the first terminal device; and the security function network element determines, based on the pre-configured first identifier of the first terminal device, that the security enhancement service is allowed to be performed on the first terminal device.

For another example, that the security function network element determines that a security enhancement service is allowed to be performed on the first terminal device includes: The security function network element receives a second identifier of the first terminal device from a first network element, where the second identifier of the first terminal device indicates that the security enhancement service is allowed to be performed on the first terminal device; and after receiving the first identifier of the first terminal device, the security function network element determines, based on a correspondence between the first identifier of the first terminal device and the second identifier of the first terminal device, that the security enhancement service is allowed to be performed on the first terminal device. It should be noted that the correspondence between the first identifier of the first terminal device and the second identifier of the first terminal device is pre-configured in the security function network element.

For another example, that the security function network element determines that a security enhancement service is allowed to be performed on the first terminal device includes: The security function network element receives a second identifier of the first terminal device from a first network element, where the second identifier of the first terminal device indicates that the security enhancement service is allowed to be performed on the first terminal device; the security function network element determines the first identifier of the first terminal device based on the second identifier of the first terminal device; and after receiving the first identifier of the first terminal device, the security function network element determines that the security enhancement service is allowed to be performed on the terminal device. It should be noted that a correspondence between the first identifier of the first terminal device and the second identifier of the first terminal device is pre-configured in the security function network element.

The second identifier of the terminal device includes one or more of the following: a user name of an external application, a third-party user identifier, an IP address, an SUPI, a PEI, a GPSI, an IMSI, an IMEI, and an IP address and an MSISDN. The second identifier of the terminal device is different from the first identifier of the terminal device, or the second identifier of the terminal device is the same as the first identifier of the terminal device. This is not limited in embodiments of this application. For example, the second identifier of the terminal device is an identifier used outside a network. For example, the second identifier of the first terminal device includes one or more of the following: a user name of an external application, a third-party user identifier, an IP address, and an IP address and an MSISDN.

It is determined, based on the second identifier that is of the first terminal device and that is received from the first network element, that the security enhancement service is allowed to be performed on the first terminal device, to satisfy different requirements of the first network element.

For example, that the security function network element receives a first identifier of a first terminal device and location area information of the first terminal device includes: The security function network element receives an access management policy association establishment request/modification message, where the access management policy association establishment request/modification message includes the first identifier of the first terminal device and the location area information of the first terminal device.

For another example, that the security function network element receives a first identifier of a first terminal device and location area information of the first terminal device includes: The security function network element receives a UE policy association establishment request/modification message, where the UE policy association establishment request/modification message includes the first identifier of the first terminal device and the location area information of the first terminal device.

For another example, that the security function network element receives a first identifier of a first terminal device and location area information of the first terminal device includes: The security function network element receives a session management policy association establishment request/modification message, where the session management policy association establishment request/modification message includes the first identifier of the first terminal device and the location area information of the first terminal device.

For another example, that the security function network element receives a first identifier of a first terminal device and location area information of the first terminal device includes: The security function network element receives a subscription data management obtaining (Nudm_subscription data management_Get, Nudm_SDM_Get)/subscription data management subscription (Nudm_SDM_Subscribe) message, where the subscription data management obtaining/subscription message includes the first identifier of the first terminal device and the location area information of the first terminal device.

For another example, that the security function network element receives a first identifier of a first terminal device and location area information of the first terminal device includes: The security function network element receives an access management policy association establishment request/modification message, where the access management policy association establishment request/modification message includes the first identifier of the first terminal device; and the security function network element obtains the location area information of the first terminal device when determining, based on the first identifier of the first terminal device, that the security enhancement service is allowed to be performed on the first terminal device. For example, the security function network element obtains the location area information of the first terminal device from a session management network element or an access and mobility management function network element.

For another example, that the security function network element receives a first identifier of a first terminal device and location area information of the first terminal device includes: The security function network element receives a UE policy association establishment request/modification message, where the UE policy association establishment request/modification message includes the first identifier of the first terminal device; and the security function network element obtains the location area information of the first terminal device when determining, based on the first identifier of the first terminal device, that the security enhancement service is allowed to be performed on the first terminal device. For example, the security function network element obtains the location area information of the first terminal device from a session management network element or an access and mobility management function network element.

For another example, that the security function network element receives a first identifier of a first terminal device and location area information of the first terminal device includes: The security function network element receives a session management policy association establishment request/modification message, where the session management policy association establishment request/modification message includes the first identifier of the first terminal device; and the security function network element obtains the location area information of the first terminal device when determining, based on the first identifier of the first terminal device, that the security enhancement service is allowed to be performed on the first terminal device. For example, the security function network element obtains the location area information of the first terminal device from a session management network element or an access and mobility management function network element.

For another example, that the security function network element receives a first identifier of a first terminal device and location area information of the first terminal device includes: The security function network element receives a subscription data management obtaining/subscription message, the subscription where data management obtaining/subscription message includes the first identifier of the first terminal device; and the security function network element obtains the location area information of the first terminal device when determining, based on the first identifier of the first terminal device, that the security enhancement service is allowed to be performed on the first terminal device. For example, the security function network element obtains the location area information of the first terminal device from a session management network element or an access and mobility management function network element.

In still another possible implementation, the security function network element receives a first identifier of a first terminal device and location area information of the first terminal device, where the location area information of the first terminal device indicates that the first terminal device is located in the target location area; the security function network element determines, based on the first identifier of the first terminal device, that a security enhancement service is allowed to be performed on the first terminal device; the security function network element determines that security analytics is allowed to be performed on the target location area; and the security function network element determines to perform security analytics on the target location area.

Security analytics is performed on the location area on which the security analytics is allowed, but security analytics is not performed on all the location areas. This can reduce signaling used for data collection and a processing burden of the security function network element For example, that the security function network element determines that a security enhancement service is allowed to be performed on the first terminal device; and determines that security analytics is allowed to be performed on the target location area includes: The security function network element pre-configures a correspondence between the first identifier of the first terminal device and a second identifier of the target location area, where the pre-configured information indicates that the security enhancement service is allowed to be performed on the first terminal device in the target location area; the security function network element obtains the first identifier of the first terminal device and the location area information of the first terminal device; and when determining, based on the correspondence between the first identifier of the first terminal device and the location area information of the first terminal device, the security function network element determines that the security enhancement service is allowed to be performed on the first terminal device, and determines to perform security analytics on the target location area.

For another example, that the security function network element determines that a security enhancement service is allowed to be performed on the first terminal device; and determines that security analytics is allowed to be performed on the target location area includes: A second identifier of the target location area is pre-configured in the security function network element, where the pre-configured information indicates to perform security analytics on the target location area; the security function network element receives a second identifier of the first terminal device from a first network element, where the second identifier indicates that the security enhancement service is allowed to be performed on the first terminal device; and after receiving the first identifier of the first terminal device and the location area information of the first terminal device, the security function network element determines, based on a correspondence between the first identifier of the first terminal device and the second identifier of the first terminal device, that the security enhancement service is allowed to be performed on the first terminal device, and determines, based on the pre-configured first identifier of the target location area, that security analytics is allowed to be performed on the target location area. It should be noted that the correspondence between the first identifier of the first terminal device and the second identifier of the first terminal device is pre-configured in the security function network element.

For another example, that the security function network element determines that a security enhancement service is allowed to be performed on the first terminal device; and determines that security analytics is allowed to be performed on the target location area includes: A second identifier of the target location area is pre-configured in the security function network element, where the pre-configuration information indicates to perform security analytics on the target location area; the security function network element receives a second identifier of the first terminal device from a first network element, where the second identifier of the first terminal device indicates that the security enhancement service is allowed to be performed on the first terminal device; the security function network element determines the first identifier of the first terminal device based on the second identifier of the first terminal device; and after receiving the first identifier of the first terminal device and the location area information of the first terminal device, the security function network element determines, based on the first identifier of the first terminal device, that the security enhancement service is allowed to be performed on the first terminal device, and determines, based on the pre-configured first identifier of the target location area, that security analytics is allowed to be performed on the target location area. It should be noted that a correspondence between the first identifier of the first terminal device and the second identifier of the first terminal device is pre-configured in the security function network element.

For another example, that the security function network element determines that a security enhancement service is allowed to be performed on the first terminal device; and determines that security analytics is allowed to be performed on the target location area includes: The first identifier of the first terminal device is pre-configured in the security function network element, where the pre-configured information indicates that the security enhancement service is allowed to be performed on the first terminal device; the security function network element receives a first identifier of the target location area from a first network element, where the first identifier of the target location area indicates that security analytics is allowed to be performed on the target location area; and after receiving the first identifier of the first terminal device and the location area information of the first terminal device, the security function network element determines, based on the pre-configured first identifier of the first terminal device, that the security enhancement service is allowed to be performed on the first terminal device, and determines, based on the first identifier of the target location area, that security analytics is allowed to be performed on the target location area.

For another example, that the security function network element determines that a security enhancement service is allowed to be performed on the first terminal device; and determines that security analytics is allowed to be performed on the target location area includes: The security function network element receives a second identifier of the first terminal device from a first network element, and the security function network element receives a first identifier of the target location area from the first network element; and after receiving the first identifier of the first terminal device and the location area information of the first terminal device, the security function network element determines, based on a correspondence between the first identifier of the first terminal device and the second identifier of the first terminal device, that the security enhancement service is allowed to be performed on the first terminal device, and determines, based on the first identifier of the target location area, that security analytics is allowed to be performed on the target location area. The second identifier of the first terminal device and the first identifier of the target location area that are received by the security function network element may be carried in a same piece of signaling, or may be carried in different pieces of signaling. This is not limited in embodiments of this application.

It should be noted that after the security function network element determines, based on the first identifier of the first terminal device and the location area information of the first terminal device, to perform security analytics on the target location area, if the security function network element receives a first identifier of a second terminal device in the target location area and location area information of the second terminal device, the security function network element may not perform security analytics on the target location area. Optionally, in predetermined time after the security function network element determines to perform security analytics on the target location area, if the security function network element receives the first identifier of the second terminal device in the target location area and the location area information of the second terminal device, the security function network element may not perform security analytics on the target location area.

Optionally, in S310, that the security function network element determines to perform security analytics on a target location area includes: The security function network element determines to perform security analytics on the target location area for a target attack. The target attack may include one or more of the following: an air interface distributed denial of service (DDoS) attack, a fake base station attack, and a DDoS attack for a core network. This is not specifically limited herein.

For example, performing security analytics on the target location area for the target attack means obtaining a security classification result of the target location area for the target attack, where the security classification result of the target location area for the target attack indicates a degree to which the potential target attack exists in the target location area.

How the security function network element determines to perform security analytics on the target location area for the target attack is not limited in embodiments of this application.

In a possible implementation, the security function network element performs security analytics on the target location area for all attacks by default, and all the attacks include the target attack. All the attacks are all attacks that may be suffered by a network and/or a terminal device.

In another possible implementation, the security function network element receives an identifier of the target attack from the first network element, and the security function network element determines, based on the identifier of the target attack, to perform security analytics on the target location area for the target attack.

For example, the security function network element receives a correspondence between the identifier of the target attack and the first identifier of the target location area from the first network element.

S320: The security function network element determines the security classification result of the target location area based on first information.

The first information is related to behavior information of a terminal device in the target location area. The behavior information of the terminal device may be used to describe a communication feature or a movement parameter of the terminal device. For example, the behavior information of the terminal device includes one or more of the following: traffic data of the terminal device, movement track information, time for communication between the terminal device and a network, an information type of the communication between the terminal device and the network, location information of the terminal device, and wake-up time of the terminal device. The behavior information of the terminal device may further include other data and/or information related to behavior of the terminal device. That the behavior information of the terminal device includes only one or more of the foregoing information is not limited in embodiments of this application. For another example, the behavior information of the terminal device may not include one or more of the foregoing information, but includes other data and/or information related to behavior of the terminal device.

In a possible implementation, the first information includes the behavior information of the terminal device in the target location area, and that the security function network element determines the security classification result of the target location area based on first information includes: The security function network element performs statistical analytics on the behavior information of the terminal device in the target location area to obtain first statistical information; and/or performs abnormal behavior prediction on the behavior information of the terminal device in the target location area to obtain a first abnormal behavior prediction result; and the security function network element determines the security classification result of the target location area based on the first statistical information and/or the first abnormal behavior prediction result. For example, the security function network element determines the security classification result of the target location area based on a proportion of terminal devices having abnormal behavior in terminal devices in the target location area. If the proportion of the terminal devices having abnormal behavior in the terminal devices in the target location area is greater than a preset threshold, it is considered that the degree to which the potential attack exists in the target location area is high, and the security classification result of the target location area is low or security enhancement is required; or if the proportion of the terminal devices having abnormal behavior in the terminal devices in the target location area is less than or equal to a preset threshold, it is considered that the degree to which the potential attack exists in the target location area is low, and the security classification result of the target location area is high or security enhancement is not required.

The first statistical information is information obtained by performing statistical summarization and calculation on the behavior information of the terminal device in the target location area. The information may be used to describe a feature of the behavior information of the terminal device in the target location area. For example, the first statistical information may include one or more of the following: an average communication frequency of the terminal device in the target location area in a period of time, average communication traffic of the terminal device in the target location area, a maximum moving distance of the terminal device in the target location area, and an average quantity of terminal devices in the target location area in a period of time.

Further, the first statistical information may further include one or more of the following: a maximum value and/or a minimum value that is of a communication frequency and that is determined based on a communication frequency of the terminal device in a period of time, a maximum value and/or a minimum value that is of a moving speed and that is determined based on location information of the terminal device in a period of time, a maximum value that is of a movement range and that is determined based on location information of the terminal device in a period of time, and a maximum value and/or a minimum value that is of communication traffic and that is determined based on communication traffic information of the terminal device in a period of time.

The abnormal behavior of the terminal device may include one or more of the following: a moving speed of the terminal device exceeds a maximum value of a moving speed range or is less than a minimum value of the moving speed range, a moving distance of the terminal device in short time exceeds a maximum value of a normal moving distance, a communication frequency exceeds a maximum value of a communication frequency range or is less than a minimum value of the communication frequency range, and data communication traffic exceeds a maximum value of a communication traffic range or is less than a minimum value of the communication traffic range.

A manner of performing statistical analytics on the behavior information of the terminal device, and a manner of performing abnormal behavior prediction on the behavior information of the terminal device are not limited in embodiments of this application.

For example, the step of performing, by the security function network element, statistical analytics on the behavior information of the terminal device includes: The security function network element obtains the behavior information of the terminal device, where the behavior information is behavior information of one terminal device at a plurality of time points, or behavior information of a plurality of terminal devices in a same location area. If the behavior information is behavior information of one terminal device at a plurality of time points, the security function network element may collect statistics on time intervals of the behavior information at the plurality of time points, to determine a communication time frequency, average communication traffic, or an average moving speed of the terminal device. If the behavior information is behavior information of a plurality of terminal devices in a same location area, the security function network element may collect statistics on a quantity of terminal devices in the location area, to determine average traffic information of the plurality of terminal devices, average speed information of the plurality of terminal devices, and the like.

For example, a manner of performing abnormal behavior prediction on the behavior information of the terminal device includes: An AI model in the security function network element may train an activity frequency of a common terminal device based on a large amount of data such as mobile data and communication frequencies of different terminal devices. The AI model may be used as a baseline of a normal terminal device. If a difference between data such as mobile data and a communication frequency of a terminal device and the AI model is large, it may be considered that the terminal device is abnormal.

A manner in which the security function network element obtains the behavior information of the terminal device in the target location area is not limited in embodiments of this application.

For example, the security function network element may collect the behavior information of the terminal device in the target location area.

Optionally, if in S310, the security function network element determines to perform security analytics on the target location area for the target attack, the security function network element may determine, based on the target attack, data and/or information that needs to be collected. For example, if the target attack relates to abnormal communication of the terminal device but does not relate to abnormal movement of the terminal device, the security function network element collects traffic data of the terminal device but does not collect movement track information of the terminal device. It should be noted that data and/or information that needs to be collected for different attacks may be partially or completely the same, or may be partially or completely different.

For another example, the security function network element may request, from a data collection network element in the target location area, behavior information of a terminal device served by the data collection network element. The data collection network element may be one or more of the following network elements: an access and mobility management function network element, a session management network element, a user plane function network element, an application function network element, a policy control function network element, and a unified data management function network element.

The security function network element sends a data collection request message to the data collection network element in the target location area, where the data collection request message is used to request the behavior information of the terminal device served by the data collection network element; and the security function network element receives, from the data collection network element, the behavior information of the terminal device served by the data collection network element. For example, the data collection request message is a data service request message, for example, an event exposure (Namf_EventExposure) message for requesting to collect information from an AMF, or an Nsmf_EventExposure message for requesting to collect information from an SMF. Correspondingly, the data collection network element sends a data collection service response message to the security function network element, where the data collection service response message includes the behavior information of the terminal device served by the data collection network element. For example, the data collection request message sent by the security function network element may be a subscription data collection event. For example, if there is a service-oriented interface between the security function network element and the data collection network element, the security function network element may request, from the data collection network element by invoking a data collection subscription service, the behavior information of the terminal device served by the data collection network element. If there is no service-oriented interface between the security function network element and the data collection network element, the security function network element may request, from the data collection network element through a network element having a service-oriented interface, the behavior information of the terminal device served by the data collection network element.

It should be noted that, if there are a plurality of data collection network elements that serve the terminal device in the target location area, the security function network element may send the data collection request message to the plurality of data collection network elements.

It should be further noted that if the data collection network element further serves a location area outside the target location area, the data collection request message may further include a second identifier of the target location area, and the second identifier of the target location area indicates the data collection network element to collect behavior information of the terminal device in the target location area.

Optionally, if in S310, the security function network element determines to perform security analytics on the target location area for the target attack, the security function network element may determine, based on the target location area and the target attack, to send the data collection request message to the data collection network element. For example, if the target attack is a DDoS attack for the core network, the security function network element determines an access and mobility management function network element serving the target location area, and sends the data collection request message to the access and mobility management function network element.

Optionally, the data collection request message further includes a first time interval parameter and/or a first threshold, the first time interval parameter indicates a periodicity for reporting the behavior information of the terminal device, and the first threshold indicates a minimum value or a maximum value for triggering reporting of the behavior information of the terminal device. Correspondingly, if the data collection request message includes the first time interval parameter, the data collection network element periodically sends the behavior information of the terminal device to the security function network element based on the first time interval parameter. If the data collection request message includes the first threshold, and the first threshold indicates the minimum value for triggering the reporting of the behavior information of the terminal device, the data collection network element sends, to the security function network element based on the first threshold, behavior information, of the terminal device, that is greater than or equal to the first threshold; or if the first threshold indicates the maximum value for triggering the reporting of the behavior information of the terminal device, the data collection network element sends, to the security function network element based on the first threshold, behavior information, of the terminal device, that is less than or equal to the first threshold.

For example, the first threshold indicates one or more of the following: a maximum value and/or a minimum value of a communication frequency, a maximum value and/or a minimum value of a moving speed, and a maximum value and/or a minimum value of communication traffic.

It may be understood that if the data collection network element periodically sends the behavior information of the terminal device to the security function network element based on the first time interval parameter, the security function network element determines the security classification result of the target location area based on the periodically received behavior information of the terminal device.

In another possible implementation, the first information includes second information sent by the security analytics network element.

Specifically, the security function network element receives the second information from the security analytics network element, where the second information includes: second statistical information, a second abnormal behavior prediction result, and/or a security classification result of a location area managed by the security analytics network element, where the second statistical information is obtained by performing statistical analytics on behavior information of a terminal device in the location area managed by the security analytics network element, the second abnormal behavior prediction result is obtained by performing abnormal behavior prediction on the behavior information of the terminal device in the location area managed by the security analytics network element, and the security classification result of the location area managed by the security analytics network element is determined based on the behavior information of the terminal device in the location area managed by the security analytics network element. The location area managed by the security analytics network element corresponds to the target location area. For example, the location area managed by the security analytics network element is the target location area, or the location area managed by the security analytics network element is a part of the target location area. Correspondingly, the security function network element determines the security classification result of the target location area based on the second information.

For more descriptions of the second statistical information, refer to the foregoing descriptions of the first statistical information.

For example, the security function network element is a centralized security analytics network element, and the security analytics network element is a distributed security analytics network element. The distributed security analytics network element is configured to perform preliminary security analytics on the managed location area, to be more specific, perform preliminary statistics collection and analytics on collected data to obtain preliminary analytics data (for example, the second statistical information and/or the second abnormal behavior prediction result). The centralized security analytics network element is configured to receive the preliminary analytics data from the distributed security analytics network element, and perform final analytics on the preliminary analytics data to obtain the security classification result of the location area.

It should be noted that, if the location area managed by the security analytics network element is the target location area, the security classification result of the target location area is the security classification result of the location area managed by the security analytics network element. If the location area managed by the security analytics network element is a part of the target location area, the security function network element receives second information separately sent by a plurality of security analytics network elements, that is, the first information includes the plurality of pieces of second information, and a sum of location areas managed by the plurality of security analytics network elements is the target location area. Correspondingly, the security function network element determines the security classification result of the target location area based on the plurality of pieces of second information. For example, the security function network element determines, based on each piece of second information, a security classification result of a location area managed by each security analytics network element, in other words, the security classification result of the target location area includes the security classification results of the location areas managed by the plurality of security analytics network elements.

For example, the security analytics network element sends the second information to the security function network element based on a request of a policy control function network element or a unified data management network element. The security analytics network element may receive a security analytics request message from the policy control function network element or the unified data management network element, where the security analytics request message is used to request performance of security analytics on the location area managed by the security analytics network element; the security analytics network element obtains the behavior information of the terminal device in the managed location area based on the security analytics request message, and determines the second information based on the behavior information of the terminal device in the managed location area; and the security analytics network element sends the second information to the security function network element. It should be noted that the security analytics request message is used to request the security analytics network element to perform security-related analytics on an analytics service, for example, request the security analytics network element to analyze a security risk for a potential attack. For example, the security analytics request message is an analytics information request (Nnwdaf_AnalyticsInfo_Request) or analytics subscription service subscription (Nnwdaf_AnalyticsSubscription_Subscribe) message for requesting an NWDAF network element to analyze abnormal behavior of a UE.

Optionally, the security analytics request message further includes a second time interval parameter, and the second time interval parameter indicates a periodicity for reporting the second information. Correspondingly, the security analytics network element periodically sends the second information to the security function network element based on the second time interval parameter. Further, the security function network element determines the security classification result of the target location area based on the periodically received second information.

Optionally, the method 300 further includes: The security function network element sends the security classification result of the location area managed by the security analytics network element to the security analytics network element. Further, the security analytics network element sends the security classification result of the location area managed by the security analytics network element to the policy control function network element or the unified data management network element.

Optionally, if the policy control function network element or the unified data management network element sends security analytics request messages to a plurality of security analytics network elements, the security analytics request message further includes an analytics identifier. The analytics identifier identifies that the plurality of security analytics request messages sent by the policy control function network element or the unified data management network element are used for a same security analytics, or the analytics identifier identifies security analytics performed on the target location area. Correspondingly, when the security analytics network elements send security classification results of location areas managed by the security analytics network elements to the policy control function network element or the unified data management network element, the analytics identifier is further included. After receiving a plurality of pieces of second information from the plurality of security analytics network elements, the policy control function network element or the unified data management network element determines, based on the analytics identifier, that the security classification results of the plurality of location areas belong to a same security analytics.

For another example, the security analytics network element sends the second information to the security function network element based on a request of the security function network element. For example, the security function network element sends a security analytics request message to the security analytics network element, where the security analytics request message is used to request the security analytics network element to perform security analytics on the managed location area; the security analytics network element obtains the behavior information of the terminal device in the managed location area based on the security analytics request message, and determines the second information based on the behavior information of the terminal device in the managed location area; and the security analytics network element sends the second information to the security function network element.

Optionally, the security analytics request message further includes a second time interval parameter, and the second time interval parameter indicates a periodicity for reporting the second information. Correspondingly, the security analytics network element periodically sends the second information to the security function network element based on the second time interval parameter. Further, the security function network element determines the security classification result of the target location area based on the periodically received second information.

Optionally, if the security function network element sends security analytics request messages to a plurality of security analytics network elements, the security analytics request message further includes an analytics identifier. The analytics identifier identifies that the plurality of security analytics request messages sent by the security function network element are used for a same security analytics, or the analytics identifier identifies security analytics performed on the target location area. Correspondingly, the second information sent by the security analytics network element to the security function network element further includes the analytics identifier. After receiving a plurality of pieces of second information from the plurality of security analytics network elements, the security function network element determines, based on the analytics identifier included in the second information, that the plurality of pieces of second information are used to determine the security classification result of the target location area.

Optionally, the method 300 further includes: The security function network element determines a security protection mode for the first terminal device, where the security protection mode is determined based on the security classification result of the target location area. The security protection mode includes a security protection mode of a Uu interface and/or a security protection mode of a PC5 interface. The security protection mode of the Uu interface includes a user plane security protection mode of the Uu interface and/or a control plane security protection mode of the Uu interface. The security protection mode of the PC5 interface includes a user plane security protection mode of the PC5 interface and/or a control plane security protection mode of the PC5 interface. Optionally, the security function network element sends the security protection mode determined for the first terminal device.

How to determine the security protection mode based on the security classification result of the target location area is not limited in embodiments of this application. For example, if the security classification result of the target location area is low or security enhancement is required, it is determined that the security protection mode is security protection enabled; if the security classification result of the target location area is high or security enhancement is not required, it is determined that the security protection mode is security protection enabled or security protection not enabled; or if the security classification result of the target location area is medium, whether to enable security protection may be determined based on transmission and processing performance of the first terminal device and the network. For another example, if a security classification result of the target location area for an air interface DDoS attack is low or security enhancement is required, it is determined that the security protection mode is air interface security protection enabled or additional authentication is enabled for air interface access.

It may be understood that if the security function network element periodically determines the security classification result of the target location area, the security function network element may periodically determine a security protection enabling mode for the first terminal device. When the security function network element periodically determines the security protection enabling mode for the first terminal device, the security function network element may dynamically adjust the security protection enabling mode of the first terminal device based on security of the target location area, to better ensure security of the network and the first terminal device.

For example, that the security function network element sends the security protection mode determined for the first terminal device includes: The security function network element sends a registration accept message to the access and mobility management function network element, where the registration accept message includes the security protection mode.

For another example, that the security function network element sends the security protection mode determined for the first terminal device includes: The security function network element sends a session management policy association modification message to the session management network element, where the session management policy association modification message includes the security protection mode.

Optionally, the method 300 further includes: The security function network element receives a security policy request message, where the security policy request message includes the location area information of the first terminal device. Correspondingly, after receiving the security policy request message, the security function network element determines the security protection mode for the first terminal device based on the security classification result of the target location area.

For example, that the security function network element receives a security policy request message includes: The security function network element receives an access management policy association establishment request/modification message from the access and mobility management function network element, where the access management policy association establishment request/modification message includes the location area information of the first terminal device.

For example, that the security function network element receives a security policy request message includes: The security function network element receives a UE policy association establishment request/modification message from the access and mobility management function network element, where the UE policy association establishment request/modification message includes the location area information of the first terminal device.

For another example, that the security function network element receives a security policy request message includes: The security function network element receives a session management policy association establishment request/modification message from a session management function network element, where the session management policy association establishment request/modification message includes the location area information of the first terminal device.

For another example, that the security function network element receives a security policy request message includes: The security function network element receives a subscription data management obtaining/subscription message from the access and mobility management function network element, where the subscription data management obtaining/subscription message includes the location area information of the first terminal device.

For another example, that the security function network element receives a security policy request message includes: The security function network element receives a subscription data management obtaining/subscription message from a session management function network element, where the subscription data management obtaining/subscription message includes the location area information of the first terminal device.

Optionally, when the security function network element is neither the policy control function network element nor the unified data management network element, the method 300 further includes: The security function network element sends a first mapping relationship to a policy control function network element or a unified data management network element, where the first mapping relationship includes an identifier of the target location area and the security classification result of the target location area. The identifier of the target location area is the first identifier of the target location area or the second identifier of the target location area.

Optionally, if the security classification result of the target location area includes the security classification result of the target location area for the target attack, the first mapping relationship includes the identifier of the target location area, the identifier of the target attack, and the security classification result of the target location area for the target attack.

In an embodiment of this application, the security function network element may determine, by default or as indicated by the first network element, the security classification result of the target location area based on the behavior information of the terminal device in the target location area after determining to perform security analytics on the target location area. This helps determine, based on the security classification result of the target location area, whether to perform security enhancement on the terminal device in the target location area, to better ensure security of the network and the terminal device. For example, when the security classification result of the target location area is low, security protection is forcibly enabled, to prevent the network or the first terminal device from being attacked to some extent.

In addition, it is determined to perform security analytics on the target location area for the target attack, to obtain the security classification result of the target location area for the target attack. In this way, this helps determine, based on the security classification result of the target location area for the target attack, a security protection mode that can prevent the target attack for the terminal device in the target location area. For example, if a security classification result of the target location area for an air interface DDoS attack indicates that a degree to which a potential air interface DDoS attack exists in the target location area is high, air interface security protection may be enabled or additional authentication for air interface access may be enabled.

It should be noted that, in an embodiment of this application, S310 and S320 are both performed by the security function network element. In an implementation process, S310 may be performed by a network element having no security analytics function, for example, by the policy control function network element or the unified data management network element, and S320 may be performed by a network element having the security analytics function, for example, by the security analytics network element.

Figure 4:
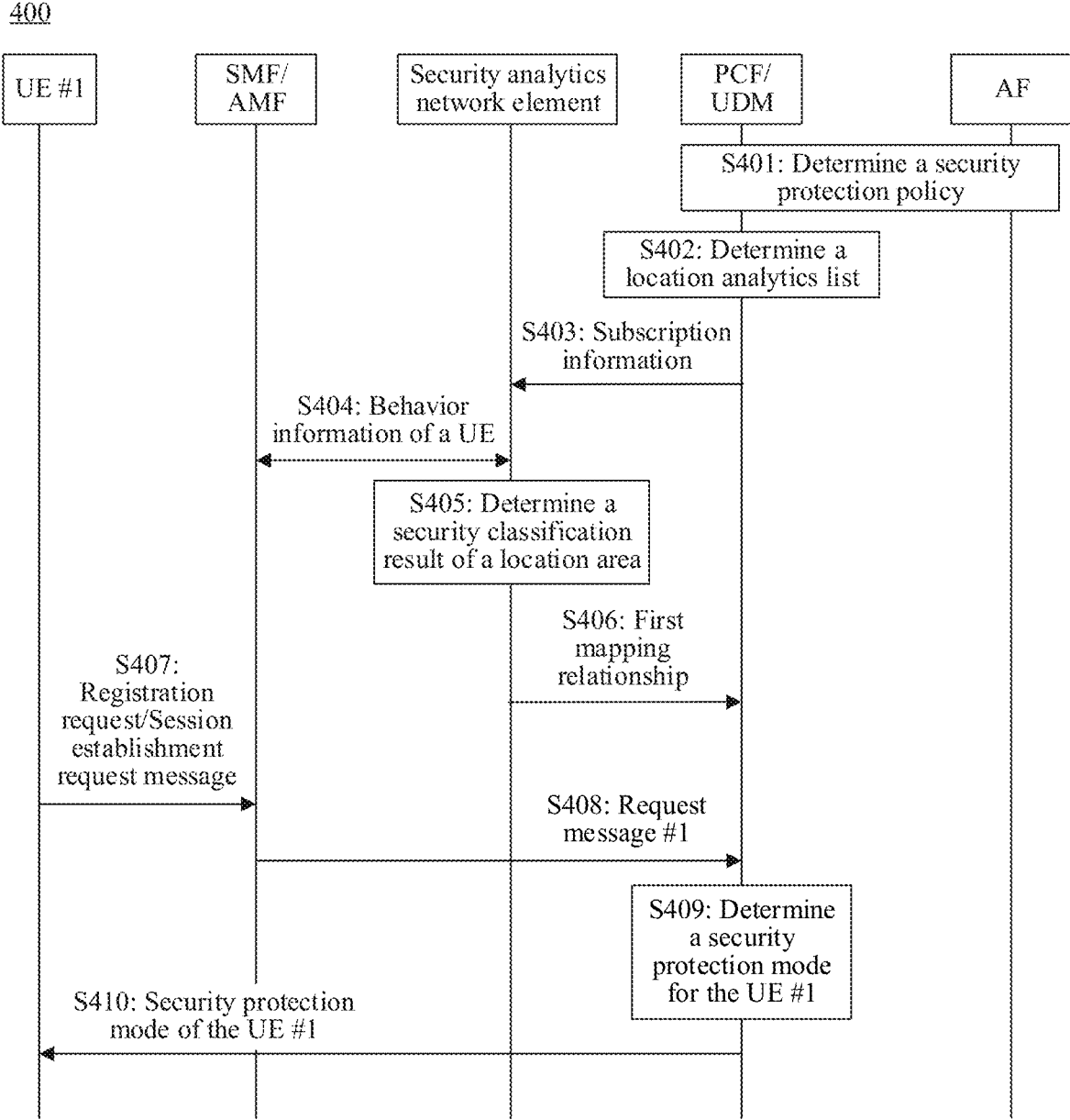
FIG. 4 is a schematic flowchart of a method according to another embodiment of this application.

FIG. 4 shows a method for obtaining a security classification result according to an embodiment of this application. As shown in FIG. 4, the method 400 may include S401 to S410. The following describes the steps in detail.

S401: A PCF or a UDM determines a security protection policy based on a requirement of an AF.

For example, the AF subscribes to a network operator, and the network operator pre-configures, for the UDM based on the requirement of the AF, a Uu interface security protection policy used by a UE.

For another example, the AF subscribes to a network operator, and the network operator pre-configures, for the PCF based on the requirement of the AF, a PC5 interface security protection policy used by a UE.

For another example, the AF sends an AF request message to send a security requirement of the UE on a PC5 interface to the PCF. A network side determines, based on the requirement of the AF, the PC5 interface security protection policy used by the UE. The AF request message may be forwarded to the PCF through an NEF, or may be directly sent to the PCF.

It should be noted that both the Uu interface security protection policy and the PC5 interface security protection policy are security protection policies used by the UE using a service corresponding to the AF.

Optionally, in S401, the AF further sends fifth information to the PCF or the UDM, to indicate to perform security analytics on one or more location areas. Specifically, during the subscription with the AF, the network operator obtains the fifth information and pre-configures the fifth information in the UDM, or the AF sends the fifth information to the PCF.

For example, the fifth information includes a first identifier of the one or more location areas. For example, the fifth information includes a first identifier of each of all location areas in a PLMN in which the PCF or the UDM is located (the PLMN in which the PCF or the UDM is located is denoted as a second PLMN below). For descriptions of the first identifier of the location area, refer to S310. It should be noted that different location areas in the second PLMN have different identifiers.

For another example, the fifth information includes a first identifier of a preset first location area, to indicate to perform security analytics on all the location areas in the second PLMN.

For another example, when the fifth information does not carry a first identifier of any location area, the fifth information indicates to perform security analytics on all the location areas in the second PLMN.

For another example, the fifth information includes preset information indicating to perform security analytics on all the location areas in the second PLMN. In this case, the preset information may be preset value information, for example, 1-bit information or full-area analytics indication information. Specific content is not limited herein.

Optionally, the fifth information further includes an attack identifier corresponding to the one or more location areas, to indicate to perform security analytics on the one or more location areas for a specific attack.

For example, the fifth information includes a preset attack identifier, to indicate to perform security analytics on the one or more location areas for all attacks.

For another example, when the fifth information does not carry any attack identifier, the fifth information indicates to perform security analytics on the one or more location areas for all attacks.

It should be noted that if the one or more location areas respectively correspond to different attacks, the fifth information includes a correspondence between the first identifier of the location area and an identifier of the attack.

The security protection policy and the fifth information that are sent by the AF to the PCF or the UDM may be carried in a same piece of signaling, or may be carried in different pieces of signaling. The PCF or the UDM may alternatively obtain the security protection policy and the fifth information through the network subscription with the operator network. This is not limited in embodiments of this application.

S402: The PCF or the UDM determines a location analytics list.

For example, if the PCF or the UDM obtains the security protection policy from the AF, the PCF or the UDM determines the location analytics list according to the security protection policy. The location analytics list includes the first identifier or a second identifier of each of all the location areas in the second PLMN. In other words, if the PCF or the UDM does not receive the fifth information from the AF, the PCF or the UDM performs security analytics on all the location areas in the second PLMN by default. For descriptions of the second identifier of the location area, refer to S310.

Optionally, the PCF or the UDM may further determine an attack analytics list according to the security protection policy, where the attack analytics list includes all attack identifiers. In other words, if the PCF or the UDM does not obtain the fifth information from the AF, the PCF or the UDM performs security analytics on all the location areas in the second PLMN for all attacks by default.

For another example, if the PCF or the UDM receives the security protection policy and the fifth information from the AF, the PCF or the UDM determines the location analytics list based on the fifth information.

For example, if the fifth information includes the first identifier of the one or more location areas, the location analytics list determined by the PCF or the UDM based on the fifth information includes the first identifier or a second identifier of the one or more location areas.

For another example, if the fifth information includes the first identifier of the preset first location area, the location analytics list determined by the PCF or the UDM based on the fifth information includes the first identifier or a second identifier of each of all the location areas in the second PLMN.

For another example, when the fifth information does not carry the first identifier of any location area, the PCF or the UDM performs security analytics on all the location areas in the second PLMN for all attacks by default.

For another example, if the fifth information includes the preset information indicating to perform security analytics on all the location areas in the second PLMN, the PCF or the UDM performs security analytics on all the location areas in the second PLMN for all attacks by default.

Optionally, if the fifth information further includes the attack identifier corresponding to the one or more location areas, the PCF or the UDM further determines an attack analytics list based on the fifth information, where the attack analytics list includes the attack identifier corresponding to the one or more location areas.

For example, if the fifth information further includes the preset attack identifier, the PCF or the UDM further determines an attack analytics list based on the fifth information, where the attack analytics list includes all attack identifiers.

For another example, when the fifth information does not carry any attack identifier, the PCF or the UDM further determines an attack analytics list based on the fifth information, where the attack analytics list includes all attack identifiers.

For example, the location analytics list and/or the attack analytics list determined by the PCF or the UDM are/is shown in Table 1. An identifier of a location area 1 may be a first identifier or a second identifier of the location area 1, and an identifier of a location area 2 may be a first identifier or a second identifier of the location area 2.

US 12,627,703 B2

49 50

TABLE 1

| Analytics list | Content |
|---|---|
| Location analytics list | Identifier of the location area 1, identifier of the location area 2, and the like |
| Attack analytics list | Identifier of an attack A (for example, an air interface DDoS attack), identifier of an attack B (for example, a fake base station attack), and the like that correspond to the location area 1. Identifier of an attack C (for example, a DDoS attack for a core network), identifier of an attack D, and the like that correspond to the location area 2 |

Optionally, the location analytics list and/or the attack analytics list may be determined by the NEF, and then the NEF sends the location analytics list and/or the attack analytics list to the PCF or the UDM.

S403: The PCF or the UDM sends subscription information to a security analytics network element.

The subscription information is used to subscribe to a security classification result of a location area.

The subscription information includes the location analytics list determined by the PCF or the UDM.

Optionally, if the PCF or the UDM further determines the attack analytics list, the subscription information further includes the attack analytics list.

S404: The security analytics network element obtains behavior information of the UE.

After receiving the subscription information from the PCF or the UDM, the security analytics network element obtains the behavior information of the UE based on the location analytics list included in the subscription information, or obtains the behavior information of the UE based on the location analytics list and the attack analytics list that are included in the subscription information.

For example, S404 includes: The security analytics network element determines, based on the subscription information of the PCF or UDM and based on the location analytics list and/or the attack analytics list, the behavior information that is of the UE and that needs to be obtained, and determines a target network element and a data collection request message, where the target network element includes one or more network elements. The security analytics network element sends a data collection request message to the target network element, where the data collection request message is used to request to obtain, from the target network element, behavior information of a UE served by the target network element; and the security analytics network element receives the behavior information of the UE served by the target network element. The target network element may be an AMF, an SMF, a UPF, an AF, a PCF, or a UDM. This is not specifically limited herein. It should be noted that, in FIG. 4, only an example in which the security analytics network element obtains behavior information of a UE from the SMF or the AMF is used.

For more descriptions of obtaining, by the security analytics network element, the behavior information of the UE, refer to the foregoing descriptions of obtaining, by the security function network element, the behavior information of the terminal device served by the data collection network element in S320.

S405: The security analytics network element determines the security classification result of the location area.

The security analytics network element determines a security classification result of a location area corresponding to the location analytics list, where the location area corresponding to the location analytics list is a location area identified by an identifier, of the location area, included in the location analytics list. For example, if the location analytics list includes the identifier of the location area 1 and the identifier of the location area 2, location areas corresponding to the location analytics list are the location area 1 and the location area 2. For descriptions of the security classification result, refer to S310.

The security analytics network element determines, based on the behavior information that is of the UE and that is obtained from the target network element, the security classification result of the location area corresponding to the location analytics list. Specifically, for a manner in which the security analytics network element determines the security classification result of the location area based on the behavior information of the UE, refer to the foregoing descriptions in S320.

Optionally, if the subscription information further includes the attack analytics list, in S405, the security analytics network element determines security classification results of different location areas for an attack. For example, if the attack analytics list includes the identifier of the attack A corresponding to the location area 1, the security analytics network element determines a security classification result of the location area 1 for the attack A.

S406: The security analytics network element sends a first mapping relationship to the PCF or the UDM.

The first mapping relationship includes a correspondence between an identifier of a location area and a security classification result.

Optionally, if the security analytics network element determines the security classification results of the different location areas for the specific attack, the first mapping relationship may include a correspondence between an identifier of a location area, an identifier of an attack, and a security classification result.

For example, the subscription information includes the location analytics list in Table 1, and the first mapping relationship sent by the security analytics network element to the PCF or the UDM is shown in Table 2.

TABLE 2

| Identifier of a location area | Security classification result |
|---|---|
| Identifier of the location area 1 | Security classification result 1 |
| Identifier of the location area 2 | Security classification result 2 |

The security classification result 1 indicates a degree to which a potential attack exists in the location area 1, and the security classification result 2 indicates a degree to which a potential attack exists in the location area 2. It should be noted that Table 2 is described by using only an example in which the identifiers of the location areas correspond one-to-one to the security classification results. If security classification results of a plurality of location areas are the same, identifiers of the plurality of location areas may correspond to one security classification result.

For example, the subscription information includes the location analytics list and the attack analytics list in Table 1. The first mapping relationship sent by the security analytics network element to the PCF or the UDM is shown in Table 3 or Table 4.

TABLE 3

| Identifier of a location area | Identifier of an attack | Security classification result |
|---|---|---|
| Identifier of the location area 1 | Identifier of the attack A Identifier of the attack B | Security classification result 3 |
| Identifier of the location area 2 | Identifier of the attack C Identifier of the attack D | Security classification result 4 |

The security classification result 3 indicates a degree to which the potential attack A and the potential attack B exist in the location area 1, and the security classification result 4 indicates a degree to which the potential attack C and the potential attack D exist in the location area. It should be noted that Table 3 is described by using only an example in which the identifiers of the location areas correspond one-to-one to the security classification results. If security classification results of a plurality of location areas are the same, identifiers of the plurality of location areas may correspond to one security classification result.

TABLE 4

| Identifier of a location area | Identifier of an attack | Security classification result |
|---|---|---|
| Identifier of the location area 1 | Identifier of the attack A Identifier of the attack B | Security classification result 5 Security classification result 6 |
| Identifier of the location area 2 | Identifier of the attack C Identifier of the attack D | Security classification result 7 Security classification result 8 |

The security classification result 5 indicates a degree to which the potential attack A exists in the location area 1, the security classification result 6 indicates a degree to which the potential attack B exists in the location area 1, the security classification result 7 indicates a degree to which the potential attack C exists in the location area, and the security classification result 8 indicates a degree to which the potential attack D exists in the location area. It should be noted that Table 4 is described by using only an example in which the identifiers of the attacks correspond one-to-one to the security classification results. If security classification results of different location areas for different attacks are the same, identifiers of the different location areas and identifiers of the different attacks may correspond to one security classification result.

It should be noted that, if in S404, the data collection request message sent by the security analytics network element to the target network element includes a first time interval parameter, the security analytics network element may periodically receive the behavior information of the UE served by the target network element. Further, the security analytics network element determines the security classification result of the location area based on the periodically received behavior information of the UE, and periodically sends the first mapping relationship to the PCF or the UDM.

Correspondingly, after receiving the first mapping relationship from the security analytics network element, the PCF or the UDM locally stores the first mapping relationship.

S407: A UE #1 sends a registration request message or a session establishment request message to the SMF, or the SMF sends a registration request message or a session establishment request message.

For example, in S407, the UE #1 sends the registration request message to the AMF.

For another example, in S407, the UE #1 sends the session establishment request message to the SMF.

S408: The SMF or the AMF sends a request message #1 to the PCF or the UDM.

The request message #1 is used to request to obtain a security protection mode used by the UE #1, and the request message #1 includes location area information of the UE #1. The location area information of the UE #1 includes a first identifier or a second identifier of a location area in which the UE #1 is located.

For example, in S408, the AMF sends the request message #1 to the PCF based on the registration request message. In this case, the request message #1 may be an access management policy association establishment request/modification message, a UE policy association establishment request/modification message, a subscription data management obtaining/subscription message, or a new request message that is not defined in an existing standard. This is not specifically limited.

For another example, in S408, the SMF sends the request message #1 to the UDM based on the session establishment request message. In this case, the request message #1 may be a session management policy association establishment request/modification message, a subscription data management obtaining/subscription message, or a new request message that is not defined in an existing standard. This is not specifically limited.

Optionally, after the SMF or the AMF sends the request message #1 to the PCF or the UDM, the PCF or the UDM may also request the location information of the UE #1 from the SMF or the AMF.

S409: The PCF or the UDM determines the security protection mode for the UE #1.

Specifically, in S409, the PCF or the UDM determines the security protection mode for the UE #1 based on a security classification result of the location area in which the UE #1 is located. For example, after receiving the request message #1, the PCF or the UDM determines, in the stored first mapping relationship based on the location area information that is of the UE #1 and that is included in the request message #1, the security classification result corresponding to the location area information of the UE #1, and then determines the security protection mode for the UE #1 based on the security classification result.

For example, if the security classification result of the location area in which the UE #1 is located is low or security enhancement is required, it is determined that the security protection mode is security protection enabled; if the security classification result of the location area in which the UE #1 is located is high or security enhancement is not required, it is determined that the security protection mode is security protection enabled or security protection not enabled; or if the security classification result of the location area in which the UE #1 is located is medium, whether to enable security protection may be determined based on transmission and processing performance of the UE #1 and a network. For another example, if a security classification result of the location area in which the UE #1 is located for an air interface DDoS attack is low or security enhancement is required, it is determined that the security protection mode is air interface security protection enabled or additional authentication is enabled for air interface access.

It may be understood that if the PCF or the UDM periodically receives the first mapping relationship from the security analytics network element, when the security classification result of the location area in which the UE #1 is located changes, the PCF or the UDM may update, based on the changed security classification result, a security protection enabling mode determined for a first terminal device.

S410: The PCF or the UDM sends the security protection mode of the UE #1 to the UE #1.

In an embodiment of this application, the PCF or the UDM may subscribe to the security classification result of the location area from the security analytics network element by default, or may subscribe to the security classification result of the location area from the security analytics network element as indicated by the AF. This helps the PCF or the UDM determine the to-be-used security protection mode for the UE based on the security classification result of the location area, to better ensure security of the network and the UE.

Figure 5:
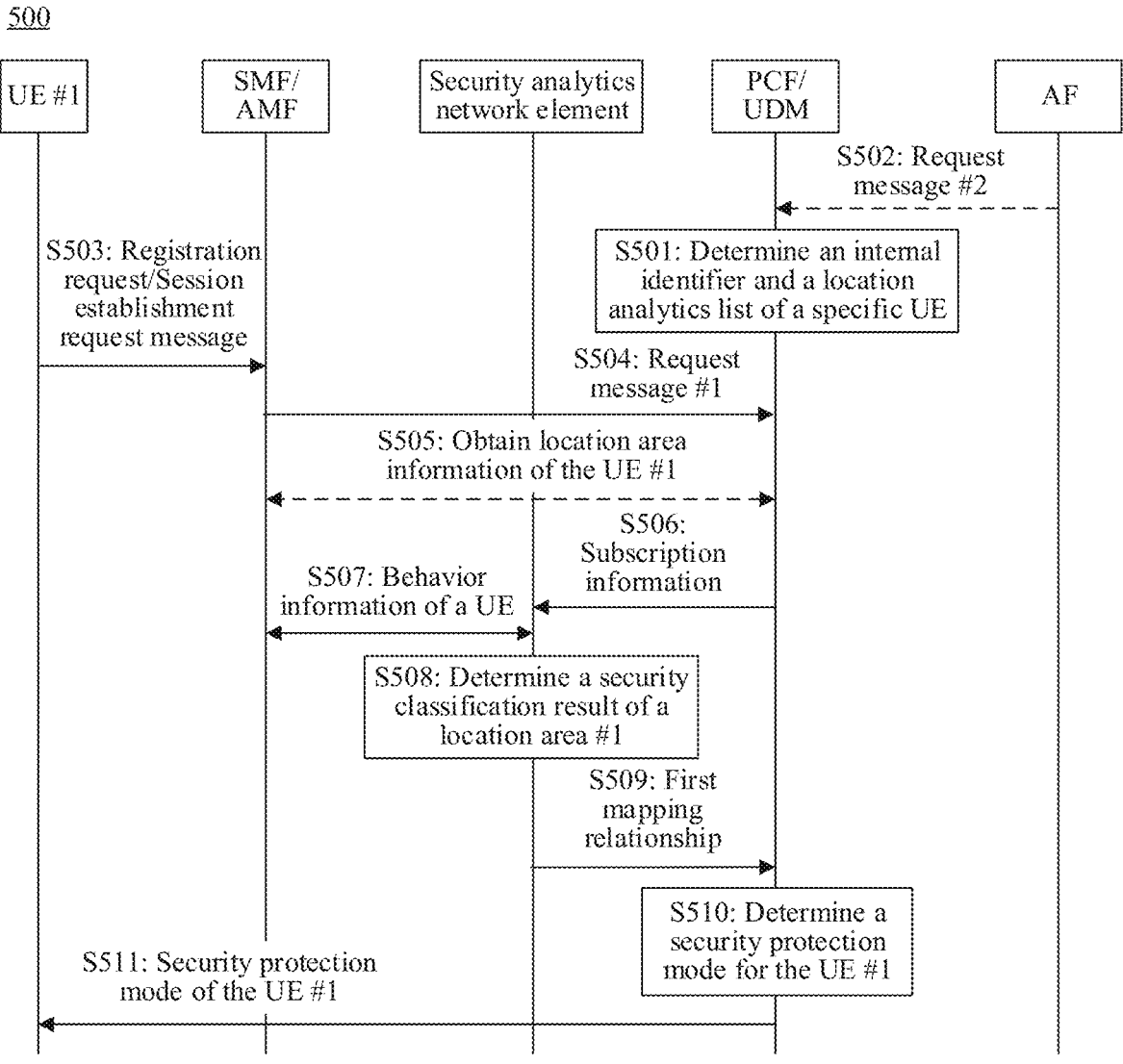
FIG. 5 is a schematic flowchart of a method according to still another embodiment of this application.

FIG. 5 shows a method for obtaining a security classification result according to an embodiment of this application. As shown in FIG. 5, the method 500 may include S501 to S511. The following describes the steps in detail.

S501: A PCF or a UDM determines an internal identifier and a location analytics list of a UE.

For example, the PCF or the UDM determines the internal identifier and the location analytics list of the UE based on pre-configured information. The pre-configured information may be configured by an AF in the PCF or the UDM by using a home network operator of the PCF or the UDM. For example, the UE may be a served high-end user corresponding to the AF, and has an additional security requirement. For example, if the pre-configured information includes a correspondence between an internal identifier and an external identifier of at least one UE (denoted as a UE group 1), the PCF or the UDM may determine that the internal identifier of the UE includes an internal identifier of each UE in the UE group 1.

Further, if the pre-configured information does not include an identifier of a location area, the PCF or the UDM performs, by default, a security enhancement service on all location areas, of the UE, in a PLMN in which the PCF or the UDM is located. For example, the location analytics list includes identifiers of all the location areas in the PLMN in which the PCF or the UDM is located. The identifier of the location area may be a first identifier of the location area or a second identifier of the location area. For descriptions of the first identifier of the location area and the second identifier of the location area, refer to S310.

If the pre-configured information includes an identifier of at least one location area (denoted as a location area group 1), the location analytics list includes an identifier of each location area in the location area group 1.

Optionally, the PCF or the UDM may further determine an attack analytics list based on the pre-configured information. If the pre-configured information does not include an identifier of an attack, the PCF or the UDM analyzes the location area for all attacks by default, for example, the attack analytics list includes identifiers of all the attacks. If the pre-configured information includes an identifier of at least one attack (denoted as an attack group 1), the attack analytics list includes an identifier of each attack in the attack group 1.

Optionally, for determining the location analytics list and/or the attack analytics list by the PCF or the UDM, further refer to the methods in S401 and S402. Details are not described herein again.

Optionally, before S501, the method 500 further includes S502: The PCF or the UDM receives a request message #2 from the AF.

The request message #2 includes an external identifier of at least one UE (denoted as a UE group 2), and the request message #2 is used to request performance of a security enhancement service on the UE group 2; or the request message #2 is used to request not to perform a security enhancement service on the UE group 2. Correspondingly, the PCF or the UDM may determine an internal identifier of each UE in the UE group 2 based on stored correspondences between internal identifiers and external identifiers of different UEs.

Optionally, the request message #2 further includes an identifier of at least one location area (denoted as a location area group 2), to request, for the UE group 2, to perform a security enhancement service on the location area group 2; or to request, for the UE group 2, not to perform a security enhancement service on the location area group 2.

Optionally, the request message #2 further includes an identifier of at least one attack (denoted as an attack group 2), to request to performance of security analytics on the at least one location area group 2 for the attack group 2; or to request not to perform security analytics on the location area group 2 for the attack group 2.

If S502 is performed in the method 500, in S501, the PCF or the UDM determines the identifier and the location analytics list of the UE based on the pre-configured information and the request message #2. Optionally, the PCF or the UDM further determines the attack analytics list based on the pre-configured information and the request message.

If the request message #2 includes an external identifier of each UE in the UE group 2, the internal identifier that is of the specific UE and that is determined by the PCF or the UDM includes the internal identifier of each UE in the UE group 2, or the internal identifier of the specific UE includes the internal identifier of each UE in the UE group 1 and the internal identifier of each UE in the UE group 2, or the internal identifier of the specific UE includes an internal identifier of a UE in the UE group 1 other than the UE group 2. For example, if the UE group 1 includes a UE #1 and a UE #2, and the UE group 2 includes the UE #2 and a UE #3, the internal identifier of the specific UE includes internal identifiers of the UE #1 and the UE #3, or includes internal identifiers of the UE #1 to the UE #3, or includes the internal identifier of the UE #1.

If the request message #2 further includes an identifier of each location area in the location area group 2, the location analytics list determined by the PCF or the UDM includes the identifier of each location area in the location area group 2, or includes the identifier of each location area in the location area group 1 and the identifier of each location area in the location area group 2, or includes an identifier of a location area in the location area group 1 other than the location area group 2.

If the request message #2 further includes an identifier of each attack in the attack group 2, the location analytics list determined by the PCF or the UDM includes the identifier of each attack in the attack group 2, or includes the identifier of each attack in the attack group 1 and the identifier of each attack in the attack group 2, or includes an identifier of an attack in the attack group 1 other than the attack group 2.

For example, the internal identifier, the location analytics list, and the attack analytics list that are of the UE and that are determined by the PCF or the UDM are shown in Table 5. It should be noted that, in Table 5, only an example in which internal identifiers of different UEs correspond to a same location analytics list and a same attack analytics list is used, and internal identifiers of different UEs may alternatively correspond to different location analytics lists and different attack analytics lists.

includes the identifiers of all the attacks; or determines, by default, that the attack analytics list is a preset value, where the preset value indicates all the attacks.

> S503: The UE #1 sends a registration request message or a session establishment request message to an SMF or the SMF sends a registration request message or a session establishment request message.

For example, in S503, the UE #1 sends the registration request message to an AMF.

For another example, in S503, the UE #1 sends the session establishment request message to the SMF.

> S504: The SMF or the AMF sends a request message #1 to the PCF or the UDM.

The request message #1 is used to request to obtain a security protection mode used by the UE #1.

For example, in S504, the AMF sends the request message #1 to the PCF based on the registration request message, where the request message #1 includes the internal identifier of the UE #1 and location area information of the UE #1, and the location area information of the UE #1 includes a first identifier or a second identifier of a location area #1 in which the UE #1 is located. In this case, the request message #1 may be an access management policy association establishment request/modification message, a UE policy association establishment request/modification message, a subscription data management obtaining/subscription message, or a new request message that is not defined in an existing standard. This is not specifically limited.

For another example, in S504, the SMF sends the request message #1 to the UDM based on the session establishment request message, where the request message #1 includes the internal identifier of the UE #1. In this case, the request message #1 may be a session management policy association establishment request/modification message, a subscription data management obtaining/subscription message,

TABLE 5

| Internal identifier of the specific UE | Location analytics list | Attack analytics list |
|---|---|---|
| Internal identifier of the UE #1 Internal identifier of the UE #2 | Identifier of a location area 1, identifier of a location area 2, and the like | Identifier of an attack A (for example, an air interface DDoS attack), identifier of an attack B (for example, a fake base station attack), and the like that correspond to the location area 1. Identifier of an attack C (for example, a DDoS attack for a core network), identifier of an attack D, and the like that correspond to the location area 2 |

Optionally, when the request message #2 does not include the identifier of the location area in the location area group 2, the PCF or the UDM determines, by default, that security analytics needs to be performed on all the location areas in the PLMN in which the PCF or the UDM is located. The PCF or the UDM determines, by default, that the location analytics list includes all the location areas in the PLMN in which the PCF or the UDM is located; or determines, by default, that the location analytics list is a preset value, where the preset value indicates all the location areas in the PLMN in which the PCF or the UDM is located.

Optionally, when the request message #2 does not include the identifier of each attack in the attack group 2, the PCF or the UDM determines, by default, that security analytics needs to be performed on all the attacks. The PCF or the UDM determines, by default, that the attack analytics list or a new request message that is not defined in an existing standard. This is not specifically limited.

Optionally, in S504, the AMF or the SMF sends the request message #1 to the PCF or the UDM. In this case, the method 500 further includes: S505: The PCF or the UDM obtains the location area information of the UE #1 from the SMF or the AMF. For example, if the first determined internal identifier of the specific UE includes the internal identifier of the UE #1, the PCF or the UDM obtains the location area information of the UE #1 from the SMF or the AMF.

Optionally, if the first mapping relationship obtained in S509 exists in the PCF or the UDM, S506 to S509 may be skipped, and S510 is directly performed.

> S506: The PCF or the UDM sends subscription information to a security analytics network element.

For example, after receiving the request message #1, the PCF or the UDM first determines whether the internal identifier of the UE includes the internal identifier of the UE #1. If the internal identifier of the UE includes the internal identifier of the UE #1, the PCF or the UDM continues to determine whether the location analytics list includes the identifier of the location area #1 in which the UE #1 is located. If the location analytics list includes the identifier of the location area #1, the PCF or the UDM sends the subscription information to the security analytics network element, where the subscription information includes the identifier of the location area #1.

Optionally, if the PCF or the UDM determines an attack analytics list corresponding to the location area #1, the subscription information further includes the attack analytics list.

Optionally, after receiving the request message #1, the PCF or the UDM first determines whether the internal identifier of the UE includes the internal identifier of the UE #1. If the internal identifier of the UE includes the internal identifier of the UE #1, the PCF or the UDM continues to determine whether the location analytics list includes preset information of all the location areas in the PLMN in which the PCF or the UDM is located. If the location analytics list includes the preset information, the PCF or the UDM sends the subscription information to the security analytics network element, where the subscription information includes the identifier of the location area #1.

S507: The security analytics network element obtains behavior information of the UE.

Specifically, this is the same as S404 in the foregoing method 400.

S508: The security analytics network element determines a security classification result of the location area #1.

For descriptions of the security classification result, refer to S310.

The security analytics network element determines the security classification result of the location area #1 based on the obtained behavior information of the UE. Specifically, for a manner in which the security analytics network element determines the security classification result of the location area based on the behavior information of the UE, refer to the foregoing descriptions in S320 and S405.

Optionally, if the subscription information further includes the attack analytics list, in S508, the security analytics network element determines a security classification result of the location area #1 for an attack. For example, if the attack analytics list includes the identifier of the attack A corresponding to the location area #11, the security analytics network element determines a security classification result of the location area #1 for the attack A.

S509: The security analytics network element sends a first mapping relationship to the PCF or the UDM.

The first mapping relationship includes a correspondence between the identifier of the location area #1 and the security classification result.

Optionally, if the security analytics network element determines the security classification result of the location area #1 for the specific attack, the first mapping relationship may include a correspondence between the identifier of the location area #1, an identifier of an attack, and a security classification result.

S510: The PCF or the UDM determines a security protection mode for the UE #1.

Specifically, this is the same as S409 in the method 400.

S511: The PCF or the UDM sends the security protection mode of the UE #1 to the UE #1.

In an embodiment of this application, the PCF or the UDM performs the security enhancement service for the specific UE based on the pre-configured information and/or the request of an AF, instead of performing the security enhancement service for all UEs, to greatly reduce signaling for network data collection and a processing load of the security analytics network element.

Figure 6:
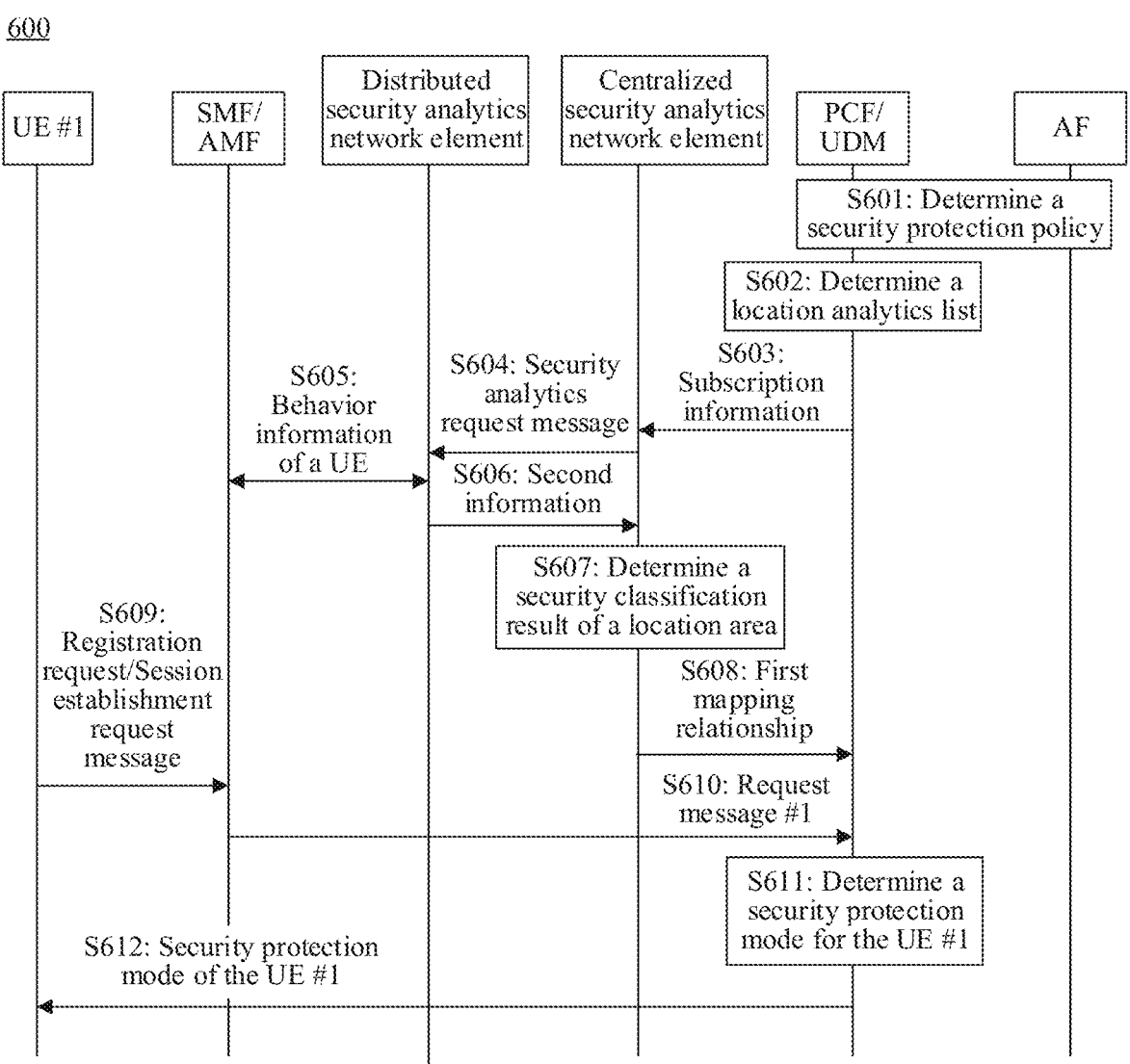
FIG. 6 is a schematic flowchart of a method according to still another embodiment of this application.

FIG. 6 shows a method for obtaining a security classification result according to an embodiment of this application. As shown in FIG. 6, the method 600 may include S601 to S612. The following describes the steps in detail.

S601 to S603 are the same as S401 to S403 in the method 400.

S604: A centralized security analytics network element sends a security analytics request message to a distributed security analytics network element.

The security analytics request message is used to request the distributed security analytics network element to perform security analytics on a managed location area, and the security analytics request message includes an analytics identifier.

After receiving the subscription information from the PCF or the UDM, the centralized security analytics network element determines, based on the location analytics list included in the subscription information, an analytics identifier and a distributed security analytics network element that correspond to the location analytics list, and sends the security analytics request message to the determined distributed security analytics network element. That the distributed security analytics network element corresponds to the location analytics list means that the location area managed by the distributed security analytics network element is a location area identified by an identifier of a location area included in the location analytics list. For example, if the location analytics list includes an identifier of a location area 1 and an identifier of a location area 2, the centralized security analytics network element may determine a distributed security analytics network element 1 and a distributed security analytics network element 2 that correspond to the location analytics list, where the distributed security analytics network element 1 manages the location area 1, and the distributed security analytics network element 2 manages the location area 2.

Optionally, if the subscription information includes the attack analytics list, the security analytics request message further includes the attack analytics list. Specifically, the attack analytics list included in the security analytics request message includes an identifier of an attack corresponding to the location area managed by the distributed security analytics network element.

S605 is the same as S404 in the method 400.

S606: The distributed security analytics network element sends second information to the centralized security analytics network element.

For example, the second information includes the analytics identifier, second statistical information, and/or a second abnormal behavior prediction result, where the second statistical information is obtained by performing statistical analytics on behavior information of a UE in the location area managed by the distributed security analytics network element, and the second abnormal behavior prediction result is obtained by performing abnormal behavior prediction on the behavior information of the UE in the location area managed by the distributed security analytics network element.

For another example, the second information includes the analytics identifier and a security classification result of the location area managed by the distributed security analytics network element.

S607: The centralized security analytics network element determines the security classification result of the location area.

Specifically, the centralized security analytics network element determines a security classification result of a location area corresponding to the location analytics list, where the location area corresponding to the location analytics list is the location area identified by the identifier, of the location area, included in the location analytics list.

For example, the centralized security analytics network element determines the security classification result of the location area based on the second statistical information and/or the second abnormal behavior prediction result. It should be noted that the centralized security analytics network element determines, based on the analytics identifier included in the second information, that the second statistical information and/or the second abnormal behavior prediction result are/is used to determine the security classification result of the location area corresponding to the location analytics list.

For another example, the centralized security analytics network element summarizes security classification results that are of location areas managed by the distributed security analytics network element and that are included in the second information, to determine the security classification result of the location area corresponding to the location analytics list. It should be noted that, the centralized security analytics network element determines, based on the analytics identifier included in the second information, that the security classification result of the location area managed by the distributed security analytics network element is used to determine the security classification result of the location area corresponding to the location analytics list.

S608 to S612 are the same as S406 to S410 in the method 400.

In an embodiment of this application, the centralized security analytics network element works with the distributed security analytics network element to determine security classification results of different location areas, so that load of a single security analytics network element can be reduced, and processing efficiency can be improved.

FIG. 7 shows a method for obtaining a security classification result according to an embodiment of this application. As shown in FIG. 7, the method 700 may include S701 to S712. The following describes the steps in detail.

S701 and S702 are the same as S401 and S402 in the method 400.

S703: The PCF or the UDM sends a security analytics request message to a distributed security analytics network element.

The security analytics request message is used to request the distributed security analytics network element to perform security analytics on a managed location area, and the security analytics request message includes an analytics identifier.

After determining the location analytics list, the PCF or the UDM determines, based on the location analytics list, an analytics identifier and a distributed security analytics network element that correspond to the location analytics list, and sends the security analytics request message to the determined distributed security analytics network element. That the distributed security analytics network element corresponds to the location analytics list means that the location area managed by the distributed security analytics network element is a location area identified by an identifier of a location area included in the location analytics list. For example, if the location analytics list includes an identifier of a location area 1 and an identifier of a location area 2, the centralized security analytics network element may determine a distributed security analytics network element 1 and a distributed security analytics network element 2 that correspond to the location analytics list, where the distributed security analytics network element 1 manages the location area 1, and the distributed security analytics network element 2 manages the location area 2.

Optionally, if the PCF or the UDM further determines the attack analytics list, the security analytics request message further includes the attack analytics list. Specifically, the attack analytics list included in the security analytics request message includes an identifier of an attack corresponding to the location area managed by the distributed security analytics network element.

S704 is the same as S404 in the method 400.

S705: The distributed security analytics network element sends a first mapping relationship to the PCF or the UDM.

The first mapping relationship includes an identifier of the location area managed by the distributed security analytics network element, a security classification result of the location area managed by the distributed security analytics network element, and the analytics identifier.

Correspondingly, the PCF or the UDM summarizes security classification results that are of location areas managed by the distributed security analytics network element and that are included in the first mapping relationship, to determine a security classification result of a location area corresponding to the location analytics list. It should be noted that the PCF or the UDM determines, based on the analytics identifier included in the first mapping relationship, that the security classification result of the location area managed by the distributed security analytics network element is used to determine the security classification result of the location area corresponding to the location analytics list.

Optionally, before S705, the method 700 further includes S706 to S708.

S706: The distributed security analytics network element sends second information to the centralized security analytics network element.

For example, the second information includes second statistical information and/or a second abnormal behavior prediction result, the second statistical information is obtained by performing statistical analytics on behavior information of a UE in the location area managed by the distributed security analytics network element, and the second abnormal behavior prediction result is obtained by performing abnormal behavior prediction on the behavior information of the UE in the location area managed by the distributed security analytics network element.

S707: The centralized security analytics network element determines the security classification result of the location area managed by the distributed security analytics network element.

The centralized security analytics network element determines, based on the second statistical information and/or the second abnormal behavior prediction result, the security classification result of the location area managed by the distributed security analytics network element.

S708: The centralized security analytics network element sends the security classification result of the location area managed by the distributed security analytics network element to the distributed security analytics network element.

S709 to S612 are the same as S407 to S410 in the method 400.

In an embodiment of this application, the centralized security analytics network element works with the distributed security analytics network element to determine security classification results of different location areas, so that load of a single security analytics network element can be reduced, and processing efficiency can be improved.

The foregoing describes in detail the methods provided in embodiments of this application with reference to FIG. 3 to FIG. 7. The following describes in detail communication apparatuses provided in embodiments of this application with reference to FIG. 8 to FIG. 10. Descriptions of the apparatus embodiments correspond to the descriptions of the method embodiments. Therefore, for content that is not described in detail, refer to the foregoing method embodiments. For brevity, details are not described herein again.

FIG. 8 is a schematic block diagram of a communication apparatus 800 according to an embodiment of this application. As shown in the figure, the communication apparatus 800 may include a transceiver unit 810 and a processing unit 820.

In a possible design, the communication apparatus 800 may be the security function network element in the foregoing method embodiments, or may be a chip configured to implement the function of the security function network element in the foregoing method embodiments.

The communication apparatus 800 may correspond to the application function network element in the method 300 according to embodiments of this application. The communication apparatus 800 may include units configured to perform the method performed by the application function network element in the method 300 in FIG. 3. In addition, the units in the communication apparatus 800 and the foregoing other operations and/or functions are separately used to implement corresponding procedures of the method 300 in FIG. 3.

When the communication apparatus 800 is configured to perform the method 300 in FIG. 3, the processing unit 820 may be configured to perform S310 and S320 in the method 300. The transceiver unit 810 may be configured to perform steps related to data and/or information receiving and sending in the method 300. For example, the transceiver unit 810 is configured to send a first mapping relationship to a policy control function network element or a unified data management network element.

In another possible design, the communication apparatus 800 may be the PCF or the UDM in the foregoing method embodiments, or may be a chip configured to implement the function of the PCF or the UDM in the foregoing method embodiments.

The communication apparatus 800 may correspond to the PCF or the UDM in the method 400 to the method 700 according to embodiments of this application. The communication apparatus 800 may include units configured to perform the method performed by the PCF or the UDM in the method 400 in FIG. 4 to the method 700 in FIG. 7. In addition, the units in the communication apparatus 800 and the foregoing other operations and/or functions are separately used to implement corresponding procedures of the method 400 in FIG. 4 to the method 700 in FIG. 7.

When the communication apparatus 800 is configured to perform the method 400 in FIG. 4, the transceiver unit 810 is configured to perform S403, S406, S408, and S410 in the method 400, and the processing unit 820 is configured to perform S401, S402, and S409 in the method 400.

When the communication apparatus 800 is configured to perform the method 500 in FIG. 5, the transceiver unit 810 is configured to perform S501, S504 to S506, S509, and S511 in the method 500, and the processing unit 820 is configured to perform S502 and S510 in the method 500.

When the communication apparatus 800 is configured to perform the method 600 in FIG. 6, the transceiver unit 810 is configured to perform S603, S608, S610, and S612 in the method 600, and the processing unit 820 is configured to perform S601, S602, and S611 in the method 600.

When the communication apparatus 800 is configured to perform the method 700 in FIG. 7, the transceiver unit 810 is configured to perform S703, S705, S710, and S712 in the method 700, and the processing unit 820 is configured to perform S701, S702, and S711 in the method 700.

In another possible design, the communication apparatus 800 may be the security analytics network element (including a centralized security analytics network element or a distributed security analytics network element) in the foregoing method embodiments, or may be a chip configured to implement the function of the security analytics network element in the foregoing method embodiments.

The communication apparatus 800 may correspond to the security analytics network element in the method 400 to the method 700 according to embodiments of this application. The communication apparatus 800 may include units configured to perform the method performed by the security analytics network element in the method 400 in FIG. 4 to the method 700 in FIG. 7. In addition, the units in the communication apparatus 800 and the foregoing other operations and/or functions are separately used to implement corresponding procedures of the method 400 in FIG. 4 to the method 700 in FIG. 7. A process in which the units perform the foregoing corresponding steps is described in detail in the foregoing method embodiments, and for brevity, details are not described herein again.

When the communication apparatus 800 is configured to perform the method 400 in FIG. 4, the transceiver unit 810 is configured to perform S403, S404, and S406 in the method 400, and the processing unit 820 is configured to perform S405 in the method 400.

When the communication apparatus 800 is configured to perform the method 500 in FIG. 5, the transceiver unit 810 is configured to perform S506, S507, and S509 in the method 500, and the processing unit 820 is configured to perform S508 in the method 500.

When the communication apparatus 800 is a centralized security analytics network element and is configured to perform the method 600 in FIG. 6, the transceiver unit 810 is configured to perform S603, S604, S606, and S608 in the method 600, and the processing unit 820 is configured to perform S607 in the method 600.

When the communication apparatus 800 is a centralized security analytics network element and is configured to perform the method 700 in FIG. 7, the transceiver unit 810 is configured to perform S706 and S708 in the method 700, and the processing unit 820 is configured to perform S707 in the method 700.

When the communication apparatus 800 is a distributed security analytics network element and is configured to perform the method 600 in FIG. 6, the transceiver unit 810 is configured to perform S604 to S606 in the method 600.

When the communication apparatus 800 is a distributed security analytics network element and is configured to perform the method 700 in FIG. 7, the transceiver unit 810 is configured to perform S703 to S706 and S708 in the method 700.

Figure 9:
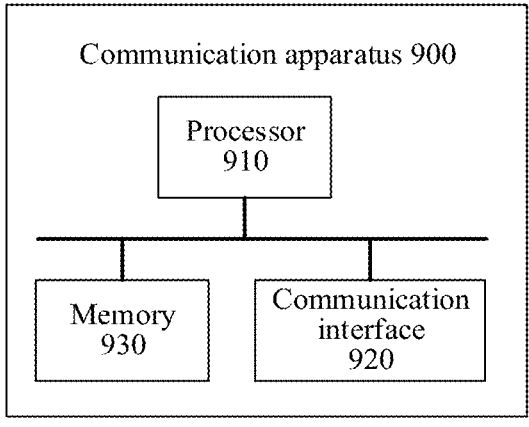
FIG. 9 is a schematic block diagram of a communication apparatus according to another embodiment of this application.

It should be further understood that the transceiver unit 810 in the communication apparatus 800 may correspond to a communication interface 920 in a communication apparatus 900 shown in FIG. 9, and the processing unit 820 in the communication apparatus 800 may correspond to a processor 910 in the communication apparatus 900 shown in FIG. 9.

It should be further understood that, when the communication apparatus 800 is a chip, the chip includes a transceiver unit and a processing unit. The transceiver unit may be an input/output circuit or a communication interface. The processing unit may be a processor, a microprocessor, or an integrated circuit integrated on the chip.

The transceiver unit 810 is configured to implement signal receiving and sending operations of the communication apparatus 800, and the processing unit 820 is configured to implement a signal processing operation of the communication apparatus 800.

Optionally, the communication apparatus 800 further includes a storage unit 830, and the storage unit 830 is configured to store instructions.

FIG. 9 is a schematic block diagram of a communication apparatus 900 according to an embodiment of this application. As shown in FIG. 9, the communication apparatus 900 includes at least one processor 910 and a communication interface 920. The processor 910 is coupled to a memory, and is configured to execute instructions stored in the memory, to control the communication interface 920 to send a signal and/or receive a signal. For example, the communication apparatus 900 further includes a memory 930, configured to store instructions.

The processor 910 and the memory 930 may be combined into one processing apparatus, and the processor 910 is configured to execute program code stored in the memory 930 to implement the foregoing functions. In an implementation, the memory 930 may be alternatively integrated in the processor 910, or may be independent of the processor 910.

When the communication apparatus 900 is a chip, the chip includes a transceiver unit and a processing unit. The transceiver unit may be an input/output circuit or a communication interface. The processing unit may be a processor, a microprocessor, or an integrated circuit integrated on the chip.

Figure 10:
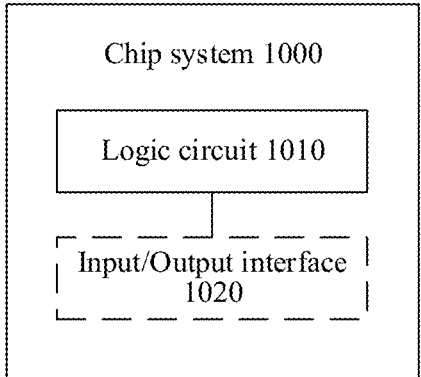
FIG. 10 is a schematic diagram of a chip system according to an embodiment of this application.

FIG. 10 is a schematic diagram of a chip system according to an embodiment of this application. The chip system herein may alternatively be a system including circuits. The chip system 1000 shown in FIG. 10 includes a logic circuit 1010 and an input/output interface 1020. The logic circuit is configured to: be coupled to the input interface, and transmit data (for example, first indication information) through the input/output interface, to perform the methods in FIG. 3 to FIG. 7.

An embodiment of this application further provides a processing apparatus, including a processor and an interface. The processor may be configured to perform the methods in the foregoing method embodiments.

The processing apparatus may be a chip. For example, the processing apparatus may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller (PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed and completed by a hardware processor, or may be performed and completed by a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a DSP, an ASIC, an FPGA or another programmable logic device, a discrete gate or a transistor logic device, or a discrete hardware component. The foregoing processor may implement or perform the methods, steps, and logical block diagrams that are disclosed in embodiments of this application. The general-purpose processor may be a microprocessor, or the processor may be any conventional processor, or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache.

According to the method provided in embodiments of this application, this application further provides a computer program product. The computer program product includes computer program code. When the computer program code is run on a computer, the computer is enabled to perform the method in any one of the embodiments shown in FIG. 3 to FIG. 7.

According to the method provided in embodiments of this application, this application further provides a computer-readable medium. The computer-readable medium stores program code. When the program code is run on a computer, the computer is enabled to perform the method in any one of the embodiments shown in FIG. 3 to FIG. 7.

According to the method provided in embodiments of this application, this application further provides a system, including the foregoing security analytics network element and the PCF or the UDM. Optionally, the system further includes an AF.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer instructions may be stored in a computer-readable storage medium, or transmitted from one computer-readable storage medium to another computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

In the several embodiments provided in this application, the disclosed system, apparatus, and method may be implemented in other manners. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely some implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining a security classification result, wherein the method comprises:

receiving, by a security function network element, an identifier of a target location area;

determining, by the security function network element, based on the identifier of the target location area, to perform security analytics on the target location area;

determining, by the security function network element, a security classification result of the target location area based on first information, wherein the security classification result indicates a degree to which a potential attack exists in the target location area, the first information is related to behavior information of a terminal device in the target location area, and the behavior information comprises at least one of traffic data or movement track information;

receiving third information from an application function network element, wherein the third information indicates to perform security analytics on all location areas in a public land mobile network (PLMN); and the determining to perform security analytics on the target location area further comprises:

determining, based on the third information, to perform security analytics on all the location areas in the PLMN, wherein all the location areas in the PLMN comprise the target location area.

2. The method according to claim 1, wherein the first information comprises the behavior information of the terminal device in the target location area, and the determining, by the security function network element, a security classification result of the target location area based on first information comprises:

performing, by the security function network element, at least one of statistical analytics on the behavior information of the terminal device in the target location area to obtain first statistical information or abnormal behavior prediction on the behavior information of the terminal device in the target location area to obtain a first abnormal behavior prediction result; and determining, by the security function network element, the security classification result of the target location area based on at least one of the first statistical information or the first abnormal behavior prediction result.

3. The method according to claim 2, wherein the method further comprises:

sending, by the security function network element, a data collection request message to a data collection network element in the target location area, wherein the data collection request message is used to request behavior information of a terminal device served by the data collection network element; and receiving, by the security function network element from the data collection network element, the behavior information of the terminal device served by the data collection network element.

4. The method according to claim 3, wherein the data collection request message further comprises at least one of a first time interval parameter or a first threshold, where the first time interval parameter indicates a periodicity for reporting the behavior information of the terminal device, and the first threshold indicates a minimum value or a maximum value for triggering reporting of the behavior information of the terminal device.

5. The method according to claim 1, wherein the first information comprises second information sent by a security analytics network element, and the second information comprises at least one of second statistical information, a second abnormal behavior prediction result, or a security classification result of a location area managed by the security analytics network element; and the second statistical information is obtained by performing statistical analytics on behavior information of a terminal device in the location area managed by the security analytics network element, the second abnormal behavior prediction result is obtained by performing abnormal behavior prediction on the behavior information of the terminal device in the location area managed by the security analytics network element, the security classification result of the location area managed by the security analytics network element is determined based on the behavior information of the terminal device in the location area managed by the security analytics network element, and the location area managed by the security analytics network element corresponds to the target location area.

6. The method according to claim 5, wherein the method further comprises:

sending, by the security function network element, a security analytics request message to the security analytics network element based on the target location area, wherein the security analytics request message is used to request the security analytics network element to perform security analytics on the location area managed by the security analytics network element.

7. The method according to claim 6, wherein the security analytics request message further comprises an analytics identifier, the second information further comprises the analytics identifier, and the analytics identifier identifies security analytics performed on the target location area.

8. The method according to claim 5, wherein the method further comprises:

sending, by the security function network element to the security analytics network element, the security classification result of the location area managed by the security analytics network element.

9. The method according to claim 1, wherein the third information comprises an identifier of each of all the location areas in the PLMN.

10. The method according to claim 1, wherein the identifier of the target location area is received by the security function network element from a first network element.

11. The method according to claim 1, wherein the method further comprises:

receiving, by the security function network element, a security policy request message, wherein the security policy request message comprises location area information of a first terminal device, and the location area information of the first terminal device indicates that the first terminal device is located in the target location area; and sending, by the security function network element, a security protection mode determined for the first terminal device, wherein the security protection mode is determined based on the security classification result of the target location area.

12. The method according to claim 1, wherein the method further comprises:

receiving, by the security function network element, a first identifier of a first terminal device and location area information of the first terminal device, wherein the location area information of the first terminal device indicates that the first terminal device is located in the target location area; and the determining, by a security function network element, based on the identifier of the target location area, to perform security analytics on the target location area comprises:

determining, by the security function network element based on the first identifier of the first terminal device, that a security enhancement service is allowed to be performed on the first terminal device; and determining, by the security function network element based on the location area information of the first terminal device, to perform security analytics on the target location area.

13. A method for obtaining a security classification result, wherein the method is performed by a policy control function network element or a unified data management network element, and the method comprises:

determining to perform security analytics on a target location area;

sending a first security analytics request message to a security analytics network element, wherein the first security analytics request message comprises an identifier of the target location area; and receiving a security classification result that is of the target location area and that is from the security analytics network element, wherein the security classification result indicates a degree to which a potential attack exists in the target location area;

receiving third information from an application function network element, wherein the third information indicates to perform security analytics on all location areas in a public land mobile network (PLMN); and the determining to perform security analytics on the target location area comprises:

determining, based on the third information, to perform security analytics on all the location areas in the PLMN, wherein all the location areas in the PLMN comprise the target location area.

14. The method according to claim 13, wherein the determining to perform security analytics on the target location area comprises:

determining to perform security analytics on the target location area for a target attack, wherein the first security analytics request message further comprises an identifier of the target attack; and the security classification result of the target location area comprises a security classification result of the target location area for the target attack, and the security classification result of the target location area for the target attack indicates a degree to which the potential target attack exists in the target location area.

15. The method according to claim 14, wherein the method further comprises:

receiving the identifier of the target attack from an application function network element; and the determining to perform security analytics on the target location area for the target attack comprises:

determining, based on the identifier of the target attack, to perform security analytics on the target location area for the target attack.

16. The method according to claim 13, wherein the method further comprises:

receiving an identifier of the target location area from an application function network element; and the determining to perform security analytics on the target location area comprises:

determining, based on the identifier of the target location area, to perform security analytics on the target location area.

17. A method for obtaining a security classification result, wherein the method comprises:

receiving, by a security analytics network element, a first security analytics request message from a policy control function network element or a unified data management network element, wherein the first security analytics request message comprises an identifier of a target location area;

determining, by the security analytics network element, a security classification result of the target location area based on first information, wherein the security classification result indicates a degree to which a potential attack exists in the target location area, the first information is related to behavior information of a terminal device in the target location area, and the behavior information comprises at least one of traffic data or movement track information;

sending, by the security analytics network element, a first mapping relationship to the policy control function network element or the unified data management network element, wherein the first mapping relationship comprises the identifier and the security classification result of the target location area;

receiving information from an application function network element, wherein the information indicates to perform security analytics on all location areas in a public land mobile network (PLMN); and determining, based on the information, to perform security analytics on all the location areas in the PLMN, wherein all the location areas in the PLMN comprise the target location area.

18. The method according to claim 17, wherein the first security analytics request message further comprises an identifier of a target attack, the security classification result of the target location area comprises a security classification result of the target location area for the target attack, and the security classification result of the target location area for the target attack indicates a degree to which the potential target attack exists in the target location area.

\* \* \* \* \*